United States Patent
Hayama et al.

(10) Patent No.: US 11,988,296 B2
(45) Date of Patent: May 21, 2024

(54) CAPACITY CONTROL VALVE

(71) Applicant: EAGLE INDUSTRY CO., LTD., Tokyo (JP)

(72) Inventors: Masahiro Hayama, Tokyo (JP); Kohei Fukudome, Tokyo (JP); Toshinori Kanzaki, Tokyo (JP); Wataru Takahashi, Tokyo (JP); Keigo Shirafuji, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 59 days.

(21) Appl. No.: 17/603,284

(22) PCT Filed: Apr. 21, 2020

(86) PCT No.: PCT/JP2020/017169
§ 371 (c)(1),
(2) Date: Oct. 12, 2021

(87) PCT Pub. No.: WO2020/218285
PCT Pub. Date: Oct. 29, 2020

(65) Prior Publication Data
US 2022/0186853 A1    Jun. 16, 2022

(30) Foreign Application Priority Data

Apr. 24, 2019   (JP) .................. 2019-083385

(51) Int. Cl.
*F16K 31/06*   (2006.01)
*F16K 17/04*   (2006.01)
*F16K 27/02*   (2006.01)

(52) U.S. Cl.
CPC ............ *F16K 27/029* (2013.01); *F16K 17/04* (2013.01); *F16K 31/0655* (2013.01)

(58) Field of Classification Search
CPC .... F16K 17/04; F16K 27/029; F16K 31/0655; F04B 27/18; F04B 27/1804;
(Continued)

(56) References Cited

U.S. PATENT DOCUMENTS 3,765,644 A    10/1973   Zeuner ............... F16K 31/0655
4,291,860 A    9/1981    Bauer ................. F16K 31/0655
(Continued)

FOREIGN PATENT DOCUMENTS

CN    2869383    2/2007  ............. F04B 49/22
CN    102384056  3/2012  ............. F04B 27/14
(Continued)

OTHER PUBLICATIONS

International Preliminary Report on Patentability issued in PCT International Patent Application Serial No. PCT/JP2020/015177, dated Oct. 14, 2021 with translation (6 pgs).
(Continued)

*Primary Examiner* — Matthew W Jellett
(74) *Attorney, Agent, or Firm* — HAYES SOLOWAY P.C.

(57) ABSTRACT

A capacity control valve includes a valve housing provided with a suction port through which a suction fluid of suction pressure passes, and a control port through which a control fluid of control pressure passes, a valve element configured to be driven by a solenoid, a spring that biases the valve element in the direction opposite to the driving direction by the solenoid, and a CS valve formed by a CS valve seat and the valve element and configured for opening and closing a communication between the control port and the suction port by movement of the valve element. The capacity control valve further includes a pressure receiving portion to which force in accordance with discharge pressure is applied in the axial direction of the valve element.

20 Claims, 15 Drawing Sheets

(58) Field of Classification Search
CPC ...... F04B 2027/1854; F04B 2027/1813; F04B 2027/185; F04B 2027/1831; F04B 49/12
See application file for complete search history.

(56) References Cited

U.S. PATENT DOCUMENTS

| | | | |
|---|---|---|---|
| 5,022,629 A | 6/1991 | Tibbals | B05B 1/3053 |
| 5,076,538 A | 12/1991 | Mohr | B60T 15/028 |
| 5,277,552 A * | 1/1994 | Higuchi | F04B 27/1804 417/269 |
| 5,401,087 A | 3/1995 | Goossens | F16J 15/56 |
| 5,503,184 A | 4/1996 | Reinartz | B60T 8/367 |
| 6,217,292 B1 | 4/2001 | Ota | F04B 27/1804 |
| 6,234,763 B1 | 5/2001 | Ota et al. | 417/222.2 |
| 6,244,159 B1 | 6/2001 | Kimura et al. | F01B 3/02 |
| 6,250,600 B1 | 6/2001 | Kumagai | G05D 16/0619 |
| 6,350,106 B1 | 2/2002 | Shimizu | F04B 27/1804 |
| 6,398,516 B1 | 6/2002 | Kawaguchi et al. | 417/222.2 |
| 6,443,708 B1 | 9/2002 | Hirota | F04B 27/1804 |
| 6,481,976 B2 | 11/2002 | Kimura | F04B 27/1804 |
| 6,585,494 B1 | 7/2003 | Suzuki | F25B 9/008 |
| 6,644,621 B2 | 11/2003 | Ji | B60T 13/686 |
| 6,772,990 B2 | 8/2004 | Sasaki et al. | F04B 49/00 |
| 6,893,215 B2 | 5/2005 | Kuwabara et al. | F01D 25/26 |
| 6,976,665 B2 | 12/2005 | Seitz | B60T 8/363 |
| 7,014,427 B1 | 3/2006 | Hirota | 417/218 |
| 8,418,723 B2 | 4/2013 | Tsuchiya | F16K 31/0655 |
| 8,550,427 B2 | 10/2013 | Yoshida | B60T 8/363 |
| 9,334,978 B2 | 5/2016 | Lappan | F04C 2/3442 |
| 9,581,149 B2 | 2/2017 | Ota et al. | F04B 27/1804 |
| 9,651,037 B2 * | 5/2017 | Sakakibara | F04B 1/26 |
| 10,316,975 B2 * | 6/2019 | Fangauer | F16K 1/38 |
| 10,781,804 B2 | 9/2020 | Higashidozono | F04B 27/18 |
| 10,823,162 B2 | 11/2020 | Kume et al. | F04B 27/18 |
| 10,837,431 B2 | 11/2020 | Tonegawa et al. | F04B 27/18 |
| 11,215,293 B2 | 1/2022 | Fukuda | F04B 53/10 |
| 11,231,111 B2 | 1/2022 | Hurst | F04B 53/102 |
| 11,480,166 B2 | 10/2022 | Hayama | F04B 27/10 |
| 2002/0031432 A1 * | 3/2002 | Ota | F04B 27/1804 417/222.2 |
| 2002/0098091 A1 | 7/2002 | Umemura | F04B 27/1804 |
| 2003/0019226 A1 | 1/2003 | Hirota | F04B 27/1804 |
| 2004/0060604 A1 | 4/2004 | Uemura | G05D 16/2024 |
| 2004/0091368 A1 | 5/2004 | Kainuma | F04B 27/1804 |
| 2005/0287014 A1 * | 12/2005 | Umemura | F04B 27/1804 417/222.1 |
| 2006/0237552 A1 * | 10/2006 | Umemura | F16K 31/0655 236/92 B |
| 2007/0069576 A1 | 3/2007 | Suzuki | B60T 8/363 |
| 2007/0164244 A1 | 7/2007 | Kratzer | F16K 31/0658 |
| 2008/0175727 A1 | 7/2008 | Umemura | F04B 27/1804 |
| 2011/0042605 A1 | 2/2011 | Gyger | F16K 25/005 |
| 2011/0091334 A1 | 4/2011 | Taguchi | F04B 27/1804 |
| 2012/0056113 A1 | 3/2012 | Tano et al. | F16K 31/12 |
| 2013/0291963 A1 | 11/2013 | Futakuchi et al. | B60H 1/00 |
| 2014/0369862 A1 | 12/2014 | Ota et al. | F04B 27/1804 |
| 2015/0044065 A1 | 2/2015 | Ota et al. | F04B 27/18 |
| 2015/0211502 A1 | 7/2015 | Ota et al. | F04B 7/0076 |
| 2016/0186733 A1 | 6/2016 | Sugamura et al. | F04B 27/1804 |
| 2019/0331249 A1 | 10/2019 | Borja | F16K 1/44 |

FOREIGN PATENT DOCUMENTS

| | | | |
|---|---|---|---|
| CN | 103671033 | 3/2014 | F04B 39/08 |
| CN | 105736308 | 7/2016 | F04B 39/00 |
| CN | 109416133 | 3/2019 | F16K 31/06 |
| EP | 0255764 | 7/1987 | F04B 1/28 |
| EP | 0945617 | 9/1999 | F04B 27/18 |
| EP | 0945618 | 9/1999 | F04B 27/18 |
| EP | 0980976 | 2/2000 | F04B 27/18 |
| EP | 1091125 | 4/2001 | F04B 27/18 |
| EP | 1098091 | 5/2001 | F04B 27/18 |
| EP | 1052124 | 11/2002 | B60H 1/32 |
| EP | 1279831 | 1/2003 | F04B 27/18 |
| EP | 1375918 | 1/2004 | F04B 27/18 |
| EP | 1512871 | 3/2005 | F04B 27/18 |
| EP | 2952741 | 12/2015 | F16K 31/06 |
| GB | 787961 | 12/1957 | F04B 43/067 |
| JP | 7-27049 | 1/1995 | F04B 24/10 |
| JP | 2000-87849 | 3/2000 | F04B 27/14 |
| JP | 2000-161234 | 6/2000 | F04B 49/00 |
| JP | 3242496 | 10/2001 | F04B 27/14 |
| JP | 2002-70732 | 3/2002 | F04B 27/14 |
| JP | 2002-201913 | 7/2002 | F01D 11/00 |
| JP | 2003-322086 | 11/2003 | F04B 49/00 |
| JP | 3581598 | 7/2004 | F04B 29/10 |
| JP | 2006-17087 | 1/2006 | F04B 27/14 |
| JP | 2006-52648 | 2/2006 | F04B 27/14 |
| JP | 3783434 | 3/2006 | F04B 27/14 |
| JP | 2011-94554 | 5/2011 | F04B 27/14 |
| JP | 2014-80927 | 5/2014 | F04B 27/14 |
| JP | 2014-126025 | 7/2014 | F04B 27/14 |
| JP | 2015-1168 | 1/2015 | F04B 27/14 |
| JP | 2015-34510 | 2/2015 | F04B 27/14 |
| JP | 5983539 | 8/2016 | F04B 27/18 |
| JP | 2017-31834 | 2/2017 | F04B 27/18 |
| JP | 2018-3884 | 1/2018 | F16K 31/06 |
| JP | 2018179087 | 11/2018 | F16K 31/06 |
| WO | WO2005095796 | 10/2005 | F04B 27/14 |
| WO | WO2012/077439 | 6/2012 | F04B 27/14 |
| WO | WO2015093502 | 6/2015 | F04B 49/80 |
| WO | WO2017057160 | 4/2017 | F04B 27/18 |

OTHER PUBLICATIONS

International Search Report and Written Opinion issued in PCT International Patent Application Serial No. PCT/JP2020/015177, dated Jun. 23, 2020 with translation (14 pgs).
International Search Report and Written Opinion issued in PCT International Patent Application Serial No. PCT/JP2020/015179, dated Jun. 9, 2020 with translation (11 pgs).
International Preliminary Report on Patentability issued in PCT International Patent Application Serial No. PCT/JP2020/015179, dated Oct. 26, 2021 with translation (5 pgs).
International Search Report and Written Opinion issued in PCT International Patent Application Serial No. PCT/JP2020/017169, dated Jun. 16, 2020 with translation (12 pgs).
International Preliminary Report on Patentability issued in PCT International Patent Application Serial No. PCT/JP2020/017169, dated Nov. 4, 2021 with translation (5 pgs).
International Search Report and Written Opinion issued in PCT International Patent Application Serial No. PCT/JP2020/017168, dated Jun. 16, 2020 with translation (14 pgs).
International Preliminary Report on Patentability issued in PCT International Patent Application Serial No. PCT/JP2020/017168, dated Nov. 4, 2021 with translation (6 pgs).
International Search Report and Written Opinion issued in PCT International Patent Application Serial No. PCT/JP2020/015176, dated Jun. 23, 2020 with translation (12 pgs).
International Preliminary Report on Patentability issued in PCT International Patent Application Serial No. PCT/JP2020/015176, dated Oct. 14, 2021 with translation (5 pgs).
International Search Report and Written Opinion issued in PCT International Patent Application Serial No. PCT/JP2020/015180, dated Jun. 9, 2020 with translation (11 pgs).
International Preliminary Report on Patentability issued in PCT International Patent Application Serial No. PCT/JP2020/015180, dated Oct. 14, 2021 with translation (5 pgs).
U.S. Appl. No. 17/599,520, filed Sep. 28, 2020, Hayama et al.
U.S. Appl. No. 17/600,529, filed Sep. 30, 2020, Hayama et al.
U.S. Appl. No. 17/599,474, filed Sep. 28, 2020, Hayama et al.
U.S. Appl. No. 17/599,467, filed Sep. 28, 2020, Hayama et al.
U.S. Appl. No. 17/603,291, filed Oct. 12, 2021, Fukudome et al.
U.S. Appl. No. 17/603,284, filed Oct. 12, 2021, Hayama et al.
Official Action issued in related U.S. Appl. No. 17/599,474, dated Mar. 2, 2023, 11 pages.
Official Action issued in related U.S. Appl. No. 17/599,467, dated Jan. 24, 2023, 11 pages.

(56) References Cited

OTHER PUBLICATIONS

Official Action issued in related U.S. Appl. No. 17/599,520, dated Jan. 30, 2023, 8 pages.
Chinese Official Action issued in related Chinese Application Serial No. 202080028782.3 dated Dec. 15, 2022, 10 pages.
Chinese Official Action issued in related Chinese Application Serial No. 202080028860.X dated Nov. 22, 2022, 12 pages.
Chinese Official Action issued in related Chinese Application Serial No. 202080026556.1, dated Oct. 9, 2022, 9 pages.
Chinese Official Action issued in related Chinese Application Serial No. 202080026542.X, dated Oct. 8, 2022, 9 pages.
Chinese Official Action issued in related Chinese Application Serial No. 202080026419.8, dated Sep. 29, 2022, 10 pages.
Chinese Official Action issued in related Chinese Application Serial No. 202080026977.4 dated Oct. 21, 2022, 11 pages.
European Search Report in related European Patent Application Serial No. 20783904.4, dated Oct. 19, 2022, 7 pages.
European Search Report issued in related European Patent Application Serial No. 20795975.0, dated Oct. 19, 2022, 7 pages.
European Search Report issued in related European Patent Application Serial No. 20795023, dated Dec. 5, 2022, 9 pages.
European Search Report issued in related European Patent Application Serial No. 20782343, dated Oct. 18, 2022, 8 pages.
European Search Report issued in related European Patent Application Serial No. 20782596, dated Nov. 2, 2022, 9 pages.
European Search Report issued in related European Patent Application Serial No. 20785209, dated Oct. 27, 2022, 8 pages.
Chinese Official Action issued in related application serial No. 202080026977.4, dated Apr. 20, 2023, 12 pages with translation.
Korean Official Action issued in related application serial No. 10-2021-7036305, dated Mar. 15, 2023, 8 pages with translation.
Official Action issued in related U.S. Appl. No. 17/599,467, dated May 10, 2023, 12 pages.
Official Action issued in related U.S. Appl. No. 17/603,291, dated May 8, 2023, 9 pages.
Official Action issued in related U.S. Appl. No. 17/599,474, dated Jun. 27, 2023, 13 pages.
Chinese Official Action issued in related application serial No. 202080026419.8, dated May 24, 2023, 10 pages with translation.
Chinese Official Action issued in related application serial No. 202080026542.X, dated Mar. 16, 2023, 11 pages with translation.
Chinese Official Action issued in related application serial No. 20208002642.X, dated Aug. 29, 2023, 13 pages with translation.
Chinese Official Action issued in related application serial No. 202080026977.4, dated Aug. 25, 2023, 17 pages with translation.
Official Action issued in related U.S. Appl. No. 17/599,474, dated Jun. 27, 2023, 12 pages.
Official Action issued in related U.S. Appl. No. 17/603,284, dated Aug. 21, 2023, 13 pages.
Official Action issued in related U.S. Appl. No. 17/603,291, dated Aug. 22, 2023, 11 pages.
Notice of Allowance issued in related U.S. Appl. No. 17/599,467, dated Aug. 8, 2023, 19 pages.
Chinese Official Action issued in related Application No. 202080026977.4, dated Nov. 16, 2023 with translation, 18 pages.
Chinese Official Action issued in related Application No. 2020080026419.8, dated Dec. 1, 2023 with translation, 17 pages.
European Search Report issued in related application serial No. 23174587.8, dated Sep. 12, 2023, 14 pages.
European Search Report issued in related application serial No. 23180732.2, dated Oct. 18, 2023, 7 pages.
Japanese Official Action issued in related Application No. 2021-516128, dated Dec. 5, 2023 with translation, 8 pages.
Official Action issued in related U.S. Appl. No. 17/599,474, dated Sep. 29, 2023, 12 pages.
Official Action issued in related U.S. Appl. No. 17/919,731, dated Nov. 9, 2023, 7 pages.
Official Action issued in related U.S. Appl. No. 17/603,291, dated Nov. 6, 2023, 11 pages.
Official Action issued in related U.S. Appl. No. 17/599,474, dated Dec. 14, 2023, 12 pages.

* cited by examiner

CAPACITY CONTROL VALVE

TECHNICAL FIELD

The present invention relates to a capacity control valve that variably controls capacity of a working fluid, for example, a capacity control valve that controls a discharge amount of a variable displacement compressor used for an air conditioning system of an automobile in accordance with pressure.

BACKGROUND ART

A variable displacement compressor used for an air conditioning system of an automobile, etc. includes a rotating shaft to be driven and rotated by an engine, a swash plate coupled to the rotating shaft in such a manner that a tilt angle is variable, compressing pistons coupled to the swash plate, etc., and by changing the tilt angle of the swash plate, changes a stroke amount of the pistons to control a discharge amount of a fluid. This tilt angle of the swash plate can be continuously changed by appropriately controlling pressure in a control chamber while utilizing suction pressure Ps of a suction chamber that suctions the fluid, discharge pressure Pd of a discharge chamber that discharges the fluid pressurized by the pistons, and control pressure Pc of the control chamber that houses the swash plate, with using a capacity control valve to be driven to open and close by electromagnetic force.

At the time of continuously driving the variable displacement compressor, the capacity control valve performs normal control in which energization is controlled by a control computer, a valve element is moved in the axial direction by electromagnetic force generated in a solenoid, and a DC valve provided between a discharge port through which a discharge fluid of the discharge pressure Pd passes and a control port through which a control fluid of the control pressure Pc passes is opened and closed to adjust the control pressure Pc of the control chamber of the variable displacement compressor.

At the time of normal control of the capacity control valve, the pressure of the control chamber in the variable displacement compressor is appropriately controlled, and by continuously changing the tilt angle of the swash plate with respect to the rotating shaft, the stroke amount of the pistons is changed to control the discharge amount of the fluid to the discharge chamber. Thus, the air conditioning system is adjusted to have a target cooling ability.

In the capacity control valve of Patent Citation 1, by opening and closing the DC valve to control the fluid of the discharge pressure Pd supplied to the control chamber of the variable displacement compressor and bringing a pressure difference between the discharge pressure Pd of the discharge chamber and the control pressure Pc of the control chamber respectively applied in the stroke direction of the pistons close to a target value, the discharge amount of the fluid discharged from the discharge chamber is changed. A valve opening degree of the DC valve is changed in accordance with the electromagnetic force by an electric current applied to the solenoid, and in response to this, the target value of the pressure difference is changed, so that the discharge amount of the fluid discharged from the discharge chamber is changed.

In Patent Citation 1, by Pd-Pc control that makes adjustment in such a manner that the fluid of the discharge pressure Pd is supplied to the control chamber to increase the control pressure Pc, it is possible to promptly perform pressure adjustment. However, in order to perform more precise pressure adjustment, a pressure sensitive body having a bellows is provided in a pressure sensitive chamber of the capacity control valve, and by extending and contracting the pressure sensitive body in the moving direction of the valve element in accordance with the suction pressure Ps, bias force is applied in the valve opening direction of the valve element, and the valve opening degree of the DC valve is adjusted. In such a way, by adjusting the valve opening degree of the DC valve by the pressure sensitive body that senses the suction pressure Ps with respect to fixed electromagnetic force in accordance with the electric current applied to the solenoid, the control pressure Pc is finely adjusted additionally taking the suction pressure Ps in consideration, and precision for controlling the discharge amount of the fluid discharged from the discharge chamber is enhanced.

CITATION LIST

Patent Literature

Patent Citation 1: JP 2017-31834 A (PAGE 6, FIG. 2)

SUMMARY OF INVENTION

Technical Problem

In the capacity control valve of Patent Citation 1, in addition to the Pd-Pc control, by using the pressure sensitive body that senses the suction pressure Ps and correcting actions of the valve element, the valve opening degree of the DC valve is adjusted and the precision for controlling the discharge amount of the fluid discharged from the discharge chamber is enhanced. However, the suction pressure Ps is low pressure and exerts a little influence on the actions of the valve element. Thus, there is a problem that it takes time before control pressure of the air conditioning system reaches a target value by adjustment of the valve opening degree.

The present invention is achieved focusing on such a problem, and an object thereof is to provide a capacity control valve in which a valve opening degree can be favorably adjusted.

Solution to Problem

In order to solve the foregoing problem, a capacity control valve according to the present invention is a capacity control valve including a valve housing provided with a suction port through which a suction fluid of suction pressure passes, and a control port through which a control fluid of control pressure passes, a valve element configured to be driven by a solenoid, a spring that biases the valve element in a direction opposite to a driving direction by the solenoid, and a CS valve formed by a CS valve seat and the valve element and configured for opening and closing a communication between the control port and the suction port by a movement of the valve element. The control pressure is controlled by opening and closing the CS valve, and the capacity control valve further includes a pressure receiving portion to which force in accordance with discharge pressure is applied in an axial direction of the valve element. According to the aforesaid feature of the present invention, it is possible to correct actions of the valve element by the discharge pressure which is high pressure. Therefore, a valve opening degree of the CS valve is more easily adjusted and it is possible to let the control pressure of an air conditioning system reach a target value in a shorter time.

It may be preferable that the pressure receiving portion is provided in the valve element. According to this preferable configuration, it is possible to apply force in accordance with the discharge pressure to the valve element operated by electromagnetic force of the solenoid. Thus, responsiveness to correction of the actions of the valve element is high.

It may be preferable that the pressure receiving portion is provided in a sliding rod which is a separate body separated from and facing the valve element. According to this preferable configuration, by combining the actions of the valve element driven by the solenoid and actions of the sliding rod by application of the force in accordance with the discharge pressure in the axial direction, it is possible to set a region where the actions of the valve element are corrected and a region where the actions are not corrected. Thus, control characteristics by correction are more easily appropriately changed.

It may be preferable that the sliding rod is connectably separated from the valve element. According to this preferable configuration, a region before the sliding rod is brought into contact with the valve element can be set as a buffering region where the force in accordance with the discharge pressure is not applied to the actions of the valve element.

It may be preferable that a biasing member is provided between the sliding rod and the valve element. According to this preferable configuration, the force in accordance with the discharge pressure, the force being applied to the sliding rod is applied to the valve element via the biasing member. Thus, the region before the sliding rod is brought into contact with the valve element can be set as a buffering region where the force in accordance with the discharge pressure is less easily applied to the actions of the valve element.

It may be preferable that a biasing member is provided between the sliding rod and the valve housing. According to this preferable configuration, the region before the sliding rod is brought into contact with the valve element can be set as the buffering region where the force in accordance with the discharge pressure is not applied to the actions of the valve element. By bringing the sliding rod into contact with the valve element, it is possible to apply the force in accordance with the discharge pressure, the force being applied to the sliding rod to the valve element in a state of suppressing by bias force of the biasing member.

It may be preferable that a seal portion that seals a part between the valve element and a guide hole provided in the valve housing is provided on the axially opposite side of the solenoid. According to this preferable configuration, the part is sealed in such a manner that a discharge fluid of the discharge pressure applied to the pressure receiving portion of the valve element does not intrude the valve housing. Thus, the discharge pressure less easily directly influences the control pressure and the suction pressure.

It may be preferable that a seal portion that seals a part between the sliding rod and a guide hole provided in the valve housing is provided on an axially opposite side of the solenoid. According to this preferable configuration, the part is sealed in such a manner that the discharge fluid of the discharge pressure applied to the pressure receiving portion of the sliding rod does not intrude the valve housing. Thus, the discharge pressure less easily directly influences the control pressure and the suction pressure.

It may be preferable that the valve element is biased in a valve opening direction of the CS valve by the spring. According to this preferable configuration, by moving the valve element in the valve opening direction at the time of non-energization, the control pressure and the suction pressure more easily match with each other, and it is possible to instantaneously restore to normal control from the maximum energized state.

DESCRIPTION OF EMBODIMENTS

Modes for carrying out a capacity control valve according to the present invention will be described below based on embodiments.

First Embodiment

A capacity control valve according to a first embodiment will be described with reference to FIGS. 1 to 3. Hereinafter, description will be given with the left and right sides seen from the front side of FIG. 1 being the left and right sides of the capacity control valve.

A capacity control valve V1 according to the first embodiment of the present invention is assembled into a variable displacement compressor (not shown) used for an air conditioning system of an automobile, etc. By variably controlling pressure of a working fluid (hereinafter, simply referred to as the "fluid") serving as a coolant, a discharge amount of the variable displacement compressor is controlled and the air conditioning system is adjusted to have a target cooling ability.

First, the variable displacement compressor will be described. The variable displacement compressor has a casing including a discharge chamber, a suction chamber, a control chamber, and plural cylinders. A communication passage providing direct communication between the discharge chamber and the control chamber is provided in the variable displacement compressor. A fixed orifice 9 for adjusting to balance pressure between the discharge chamber and the control chamber is provided in this communication passage (see FIGS. 1 and 2).

The variable displacement compressor also includes a rotating shaft to be driven and rotated by an engine (not shown) installed outside the casing, a swash plate coupled to the rotating shaft in an eccentric state by a hinge mechanism in the control chamber, and plural pistons coupled to the swash plate and fitted reciprocatably in the respective cylinders. With using the capacity control valve V1 to be driven to open and close by electromagnetic force, a tilt angle of the swash plate is continuously changed by appropriately controlling pressure in the control chamber while utilizing suction pressure Ps of the suction chamber that suctions the fluid, discharge pressure Pd of the discharge chamber that discharges the fluid pressurized by the pistons, and control pressure Pc of the control chamber that houses the swash plate. Thereby, a stroke amount of the pistons is changed to control a discharge amount of the fluid.

Figure 1:
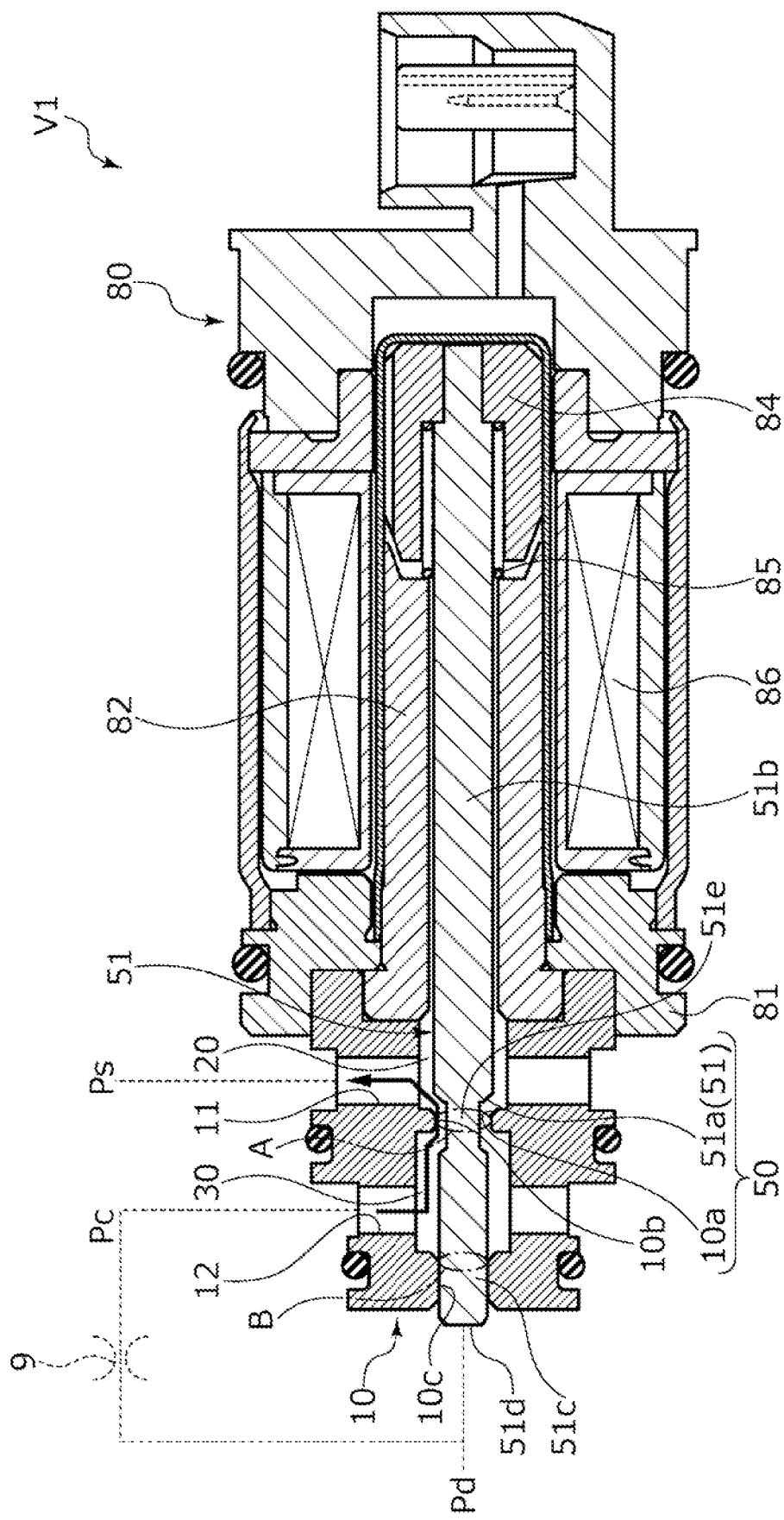
FIG. 1 is a sectional view showing a state where a CS valve is opened in a non-energized state of a capacity control valve according to a first embodiment of the present invention.
Figure 2:
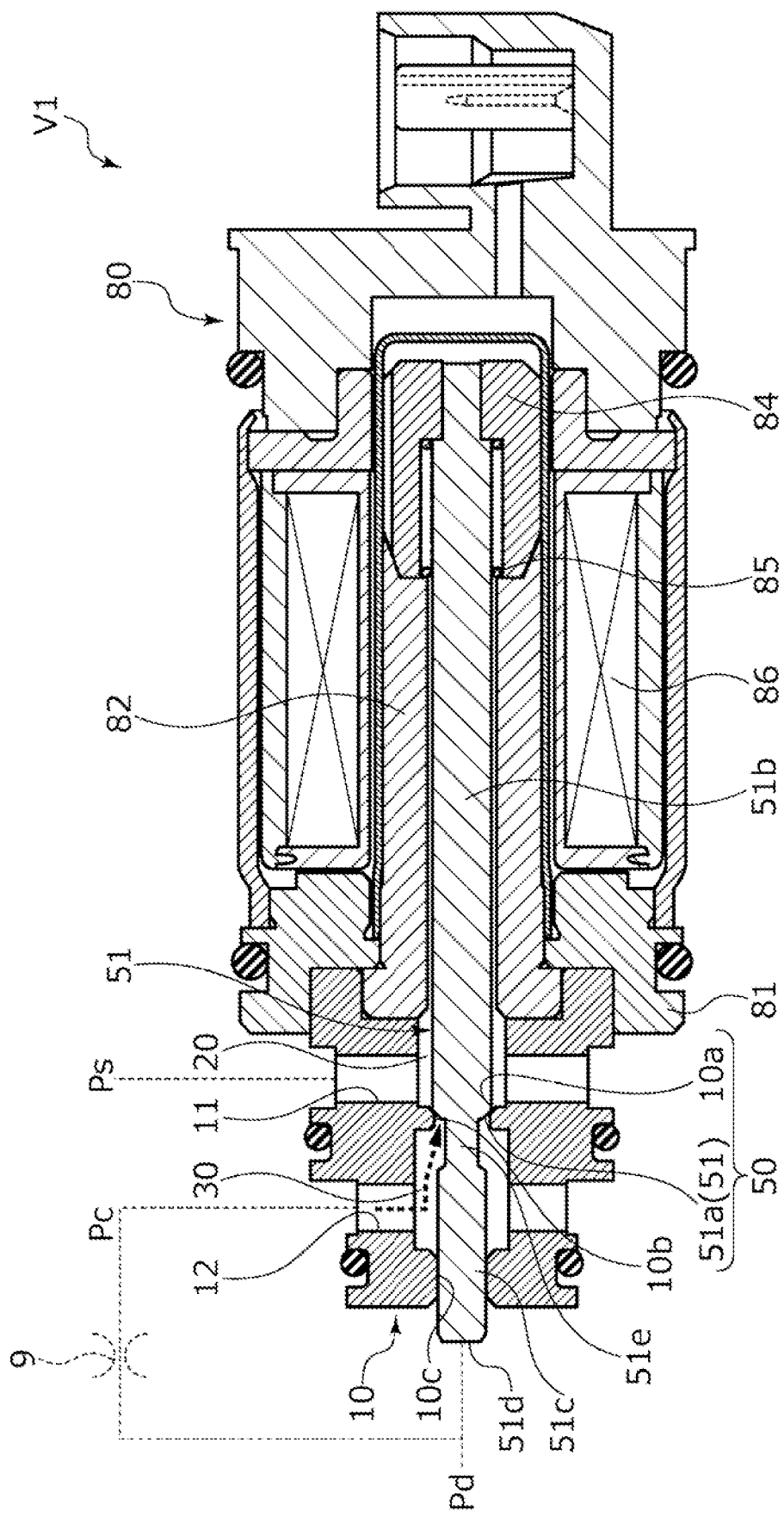
FIG. 2 is a sectional view showing a state where the CS valve is closed in an energized state (e.g., at the time of normal control) of the capacity control valve according to the first embodiment.
Figure 3:
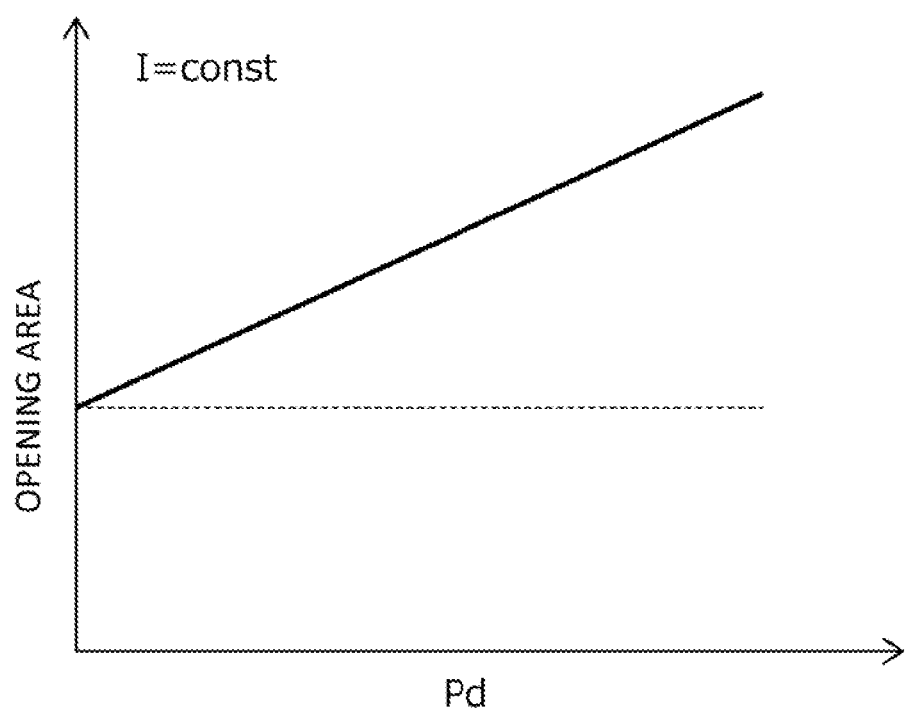
FIG. 3 is a graph showing a change characteristic of an opening area of the CS valve in accordance with discharge pressure Pd in an energized state (e.g., at the time of normal control) of the capacity control valve according to the first embodiment, in particular, at the time of a constant electric current.

As shown in FIGS. 1 and 2, the capacity control valve V1 assembled into the variable displacement compressor adjusts an electric current energized in a coil 86 forming a solenoid 80 and performs open/close control of a CS valve 50 in the capacity control valve V1, so that by controlling the fluid flowing out to the suction chamber from the control chamber, the control pressure Pc in the control chamber is variably controlled. A discharge fluid of the discharge pressure Pd of the discharge chamber is always supplied to the control chamber via the fixed orifice 9, and the control pressure Pc in the control chamber can be increased by closing the CS valve 50 in the capacity control valve V1.

In the first embodiment, the CS valve 50 is formed by a CS valve element 51 serving as a valve element and a CS valve seat 10*a* formed on an inner peripheral surface of a valve housing 10. By bringing and separating a step portion 51*a* formed in an axially left end portion of a large diameter portion 51*b* of the CS valve element 51 into contact with and from the CS valve seat 10*a*, the CS valve 50 is opened and closed.

Next, a structure of the capacity control valve V1 will be described. As shown in FIGS. 1 and 2, the capacity control valve V1 is mainly formed by the valve housing 10 made of a metal material or a resin material, the CS valve element 51 whose axially left end portion is arranged in the valve housing 10, and the solenoid 80 connected to the valve housing 10, the solenoid that applies drive force to the CS valve element 51.

As shown in FIGS. 1 and 2, the solenoid 80 is mainly formed by a casing 81 having an opening portion 81*a* which is open on the axially left side, a substantially cylindrical center post 82 inserted into the opening portion 81*a* of the casing 81 from the axially left side and fixed on the radially inner side of the casing 81, the CS valve element 51 inserted into the center post 82 reciprocatably in the axial direction, the center post whose axially left end portion is arranged in the valve housing 10, a movable iron core 84 to which an axially right end portion of the large diameter portion 51*b* of the CS valve element 51 is inserted and fixed, a coil spring 85 provided between the center post 82 and the movable iron core 84, the coil spring serving as a spring that biases the movable iron core 84 to the axially right side which is the valve opening direction of the CS valve 50, and the excitation coil 86 wound on the outside of the center post 82 via a bobbin.

As shown in FIGS. 1 and 2, the CS valve element 51 is a stepped and pillar-shaped body formed by integrating the large diameter portion 51*b* in which the step portion 51*a* is formed in an axially left end and a small diameter portion 51*c* provided continuously to the axially left side of the large diameter portion 51*b*, the small diameter portion having a smaller diameter than the large diameter portion 51*b*, and also serves as a rod arranged to pass through the coil 86 of the solenoid 80. The small diameter portion 51*c* has a constriction portion 51*e* having a smaller diameter than an axially left end of the small diameter portion 51*c* in a part which is continuous to the step portion 51*a* of the large diameter portion 51*b*. Thus, a flow passage having a constant section is ensured at the time of opening the CS valve 50.

As shown in FIGS. 1 and 2, in the valve housing 10, a Ps port 11 serving as a suction port which communicates with the suction chamber of the variable displacement compressor, and a Pc port 12 serving as a control port which communicates with the control chamber of the variable displacement compressor are formed.

Inside the valve housing 10, a first valve chamber 20 communicating with the Ps port 11, the first valve chamber in which the axially left end portion of the large diameter portion 51*b* of the CS valve element 51 is arranged reciprocatably in the axial direction is formed on the axially right side, that is, on the solenoid 80 side, and a second valve chamber 30 communicating with the Pc port 12, the second valve chamber in which the small diameter portion 51*c* of the CS valve element 51 is arranged reciprocatably in the axial direction is formed on the axially left side.

On the inner peripheral surface of the valve housing 10, a valve hole 10*b* providing communication between the first valve chamber 20 and the second valve chamber 30, the valve hole into which the small diameter portion 51*c* of the CS valve element 51 is inserted is formed. On the inner peripheral surface of the valve housing 10, the CS valve seat 10a is formed at an opening end edge of the valve hole 10b on the first valve chamber 20 side.

On the inner peripheral surface of the valve housing 10, a guide hole 10c with which an outer peripheral surface of the small diameter portion 51c of the CS valve element 51 is slidable in a substantially sealed state is formed on the axially left side of the second valve chamber 30, that is, on the axially opposite side of the solenoid 80. Between an inner peripheral surface of the guide hole 10c and the outer peripheral surface of the small diameter portion 51c of the CS valve element 51, a minute gap is formed by slightly separating in the radial direction. The CS valve element 51 is smoothly movable with respect to the valve housing 10 in the axial direction.

The small diameter portion 51c of the CS valve element 51 projects to the axially left side from the guide hole 10c of the valve housing 10. A pressure receiving surface 51d serving as a pressure receiving portion that receives the discharge pressure Pd of the discharge chamber of the variable displacement compressor is formed in an axially left end of the CS valve element 51, that is, the axially left end of the small diameter portion 51c.

Next, actions of the capacity control valve V1, mainly actions of opening and closing the CS valve 50 will be described.

First, a non-energized state of the capacity control valve V1 will be described. As shown in FIG. 1, in the capacity control valve V1, in a non-energized state, by pressing the movable iron core 84 to the axially right side by bias force of the coil spring 85, the CS valve element 51 is moved to the axially right side together, the step portion 51a of the CS valve element 51 is separated from the CS valve seat 10a, and the CS valve 50 is opened.

At this time, to the CS valve element 51, the bias force $F_{sp}$ of the coil spring 85, force $F_{Pd}$ by the discharge pressure Pd of the discharge fluid to the pressure receiving surface 51d having a pressure receiving area B which is equal to a sectional area of the small diameter portion 51c of the CS valve element 51, and force $F_{Pc}$ by the control pressure Pc of the control fluid to the CS valve element 51 are applied to the axially right side, and force $F_{Ps}$ by the suction pressure Ps of the suction fluid to the CS valve element 51 is applied to the axially left side. That is, given that the right side is the positive side, force $F_{rod} = F_{sp} + F_{Pd} + F_{Pc} - F_{Ps}$ is applied to the CS valve element 51. By making a valve opening portion area A where the step portion 51a of the CS valve element 51 and the CS valve seat 10a are brought into contact with and separated from each other and the pressure receiving area B of the CS valve element 51 substantially the same as each other, it is possible to cancel an influence of the control pressure Pc applied to the CS valve element 51.

Next, an energized state of the capacity control valve V1 will be described. As shown in FIG. 2, in the capacity control valve V1, in an energized state, that is, at the time of normal control, at the time of so-called duty control, when electromagnetic force $F_{sol}$ generated by applying the electric current to the solenoid 80 exceeds the force $F_{rod}$ (i.e., $F_{sol} > F_{rod}$), by pulling the movable iron core 84 to the axially left side, that is, toward the center post 82, and moving the CS valve element 51 fixed to the movable iron core 84 to the axially left side together, the step portion 51a of the CS valve element 51 is seated on the CS valve seat 10a, and the CS valve 50 is closed.

At this time, to the CS valve element 51, the electromagnetic force $F_{sol}$ is applied on the axially left side, and the force $F_{rod}$ is applied on the axially right side. That is, given that the right side is the positive side, force $F_{rod} - F_{sol}$, in detail, force $F_{sp} + F_{Pd} + F_{Pc} - F_{Ps} - F_{sol}$ is applied to the CS valve element 51.

The discharge pressure Pd applied to the pressure receiving surface 51d of the CS valve element 51 is occasionally changed in accordance with the discharge amount of the variable displacement compressor required from the air conditioning system. Therefore, the force $F_{Pd}$ applied to the CS valve element 51 to the axially right side is changed in accordance with the discharge pressure Pd. In a case where the electric current energized in the solenoid 80 is constant, as shown by a solid graph line in FIG. 3, an opening area of the CS valve 50 is increased in proportion to the discharge pressure Pd. As shown by a dotted graph line in FIG. 3, when the discharge pressure Pd is not applied to the pressure receiving surface 51d of the CS valve element 51, and in a case where an electric current I energized in the solenoid 80 is constant, the opening area of the CS valve 50 is not changed (the same applies to dotted graph lines in FIGS. 7, 11, and 15 to be described later).

According to this, in the capacity control valve V1, Pc-Ps control that opens and closes the CS valve 50 to supply the control fluid of the control pressure Pc supplied from the Pc port 12 to the suction chamber via the Ps port 11 and lower the control pressure Pc of the control chamber is performed, and the discharge pressure Pd which is higher pressure than the control pressure Pc and the suction pressure Ps can be applied to the pressure receiving surface 51d of the CS valve element 51 to the axially right side, that is, in the valve opening direction of the CS valve 50, and used for correction of actions of the CS valve element 51. Therefore, a valve opening degree of the CS valve 50 is more easily adjusted and it is possible to let the control pressure Pc of the air conditioning system reach a target value in a short time.

By forming the pressure receiving surface 51d to which the discharge pressure Pd is applied in the CS valve element 51, it is possible to apply the force $F_{Pd}$ in accordance with the discharge pressure Pd to the CS valve element 51 having the step portion 51a where the CS valve 50 is opened and closed. Thus, responsiveness to correction of the actions of the CS valve element 51 is high. In addition, there is no need for adjusting the actions of the CS valve element 51 by using a pressure sensitive body unlike conventional examples, and by using the discharge pressure Pd which is high pressure for correction of the actions of the CS valve element 51, an axial end surface of the CS valve element 51 formed by the pillar-shaped body is utilized as the pressure receiving surface 51d, so that the pressure receiving area can be decreased. Thus, it is possible to provide the capacity control valve V1 in which the number of parts is small, and size is reduced.

By using the discharge pressure Pd for correction of the actions of the CS valve element 51, it is possible to adjust the valve opening degree of the CS valve 50 following a change in the discharge pressure Pd in accordance with a supply amount of the discharge fluid supplied to the control chamber via the fixed orifice 9 which is provided in the variable displacement compressor or a leakage amount of the discharge fluid by a blow-by gas leaked to the control chamber from a gap which is formed between the cylinders and the pistons of the variable displacement compressor. Thus, it is possible to let the control pressure Pc of the air conditioning system reach the target value in a shorter time.

The capacity control valve V1 is formed as a normal open type in which the CS valve element 51 is biased in the valve opening direction of the CS valve 50 by the coil spring 85.

Thus, it is possible to reliably move the CS valve element 51 to a valve opening position by a decrease in a value of the electric current applied to the solenoid 80, and to instantaneously restore from the maximum energized state of the maximum duty to a less-energized state, the so-called duty control. By moving the CS valve element 51 in the valve opening direction in a non-energized state of the capacity control valve V1, it is possible to make the control pressure Pc and the suction pressure Ps more easily match with each other.

Figure 4:
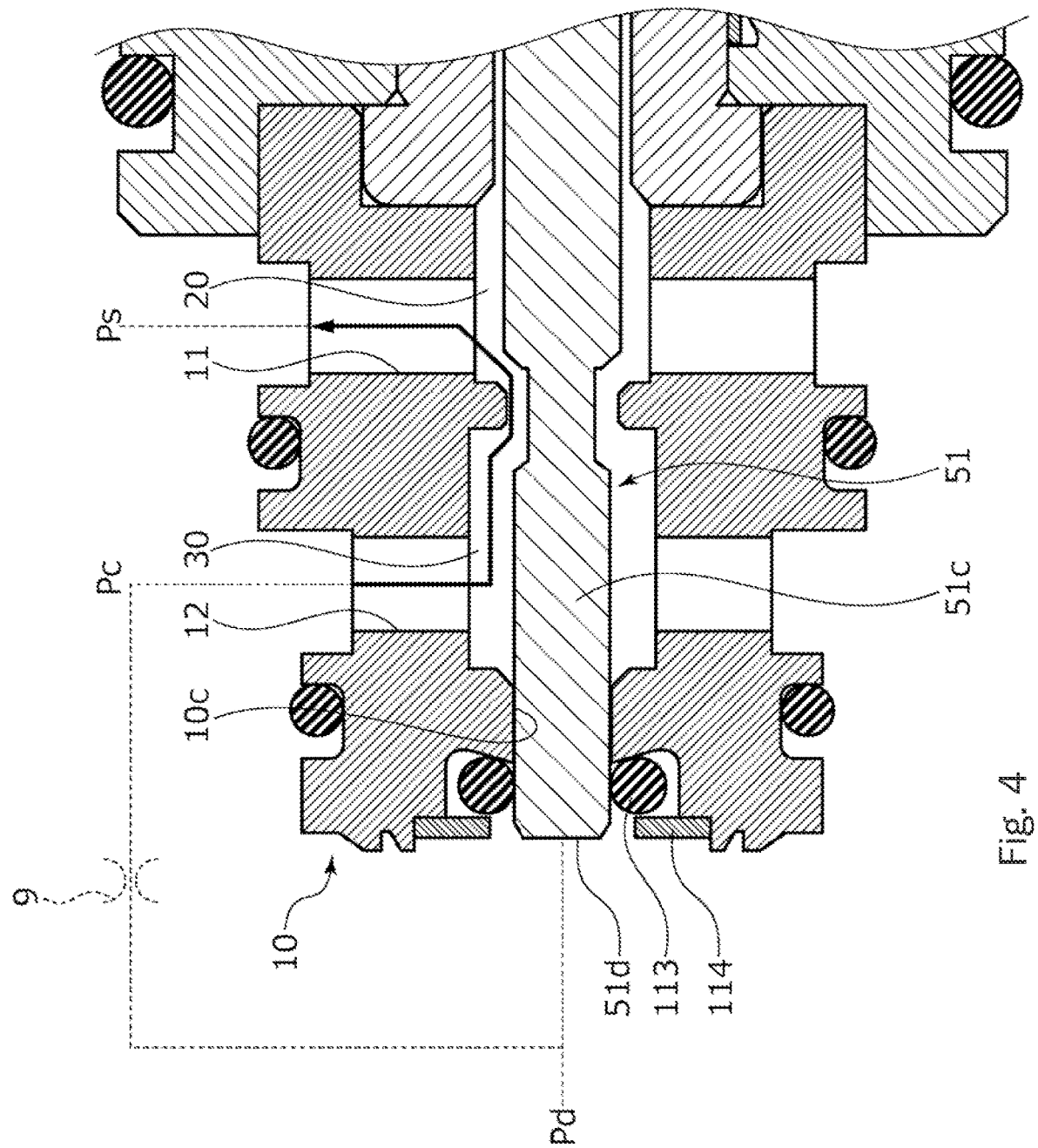
FIG. 4 is a sectional view showing a modified example of the capacity control valve according to the first embodiment.

As a modified example of the capacity control valve V1 of the first embodiment, as shown in FIG. 4, an O ring 113 serving as a seal portion that seals a part between the guide hole 10c and the small diameter portion 51c of the CS valve element 51 may be provided on the axially opposite side of the solenoid 80, that is, in an axially left end portion of the valve housing 10. According to this, the discharge fluid of the discharge pressure Pd applied to the pressure receiving surface 51d of the CS valve element 51 is prevented from intruding the valve housing 10 through the guide hole 10c. Thus, it is possible to enhance a controlling property of the control pressure Pc. By substantially fixing the O ring 113 by a fixing member 114 provided in an axially left end of the valve housing 10, it is possible to maintain a seal property irrespective of the actions of the CS valve element 51.

Second Embodiment

Next, a capacity control valve according to a second embodiment of the present invention will be described with reference to FIGS. 5 to 7. Duplicated description for the same configurations as the first embodiment is omitted.

Figure 5:
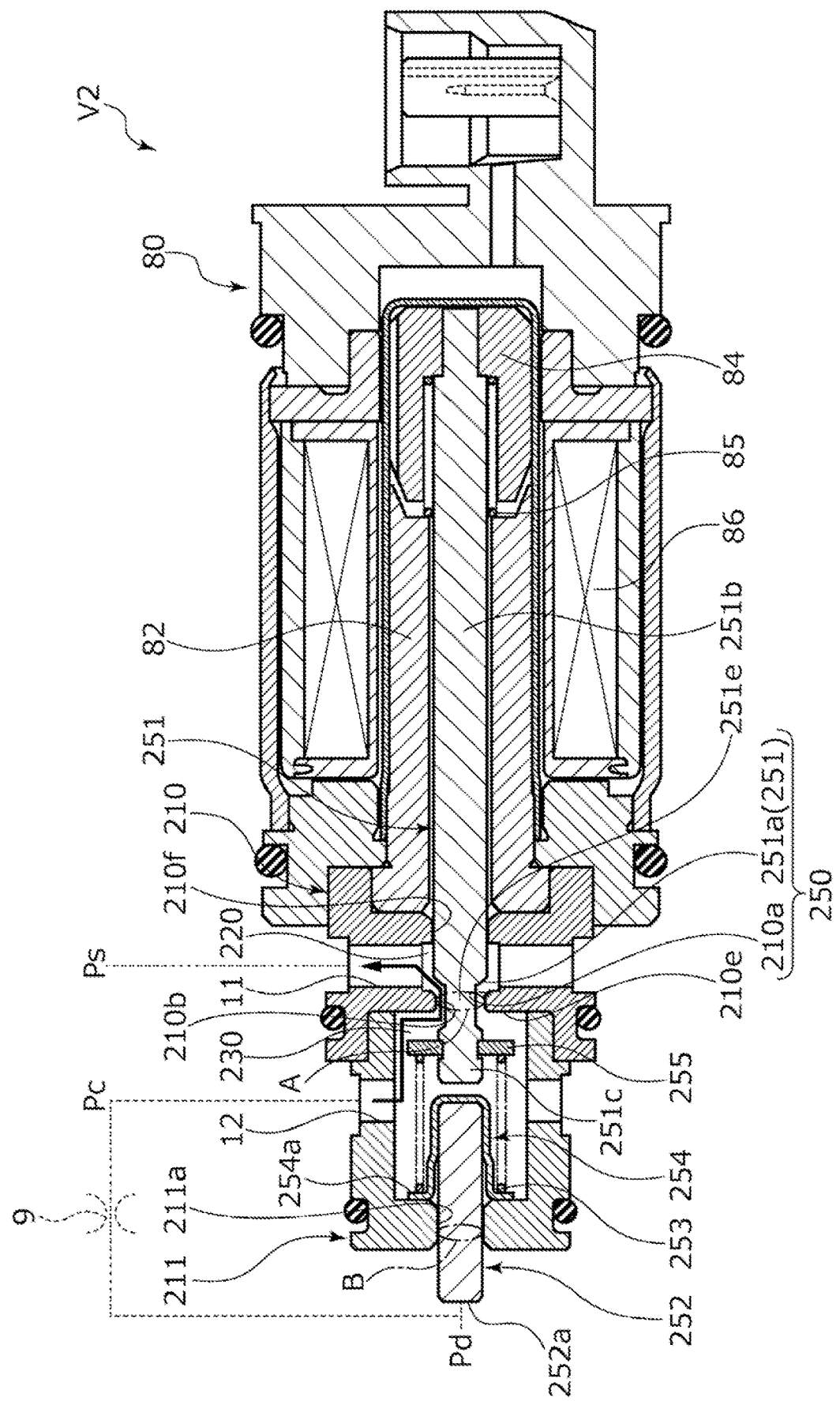
FIG. 5 is a sectional view showing a state where a CS valve is opened in a non-energized state of a capacity control valve according to a second embodiment of the present invention.
Figure 6:
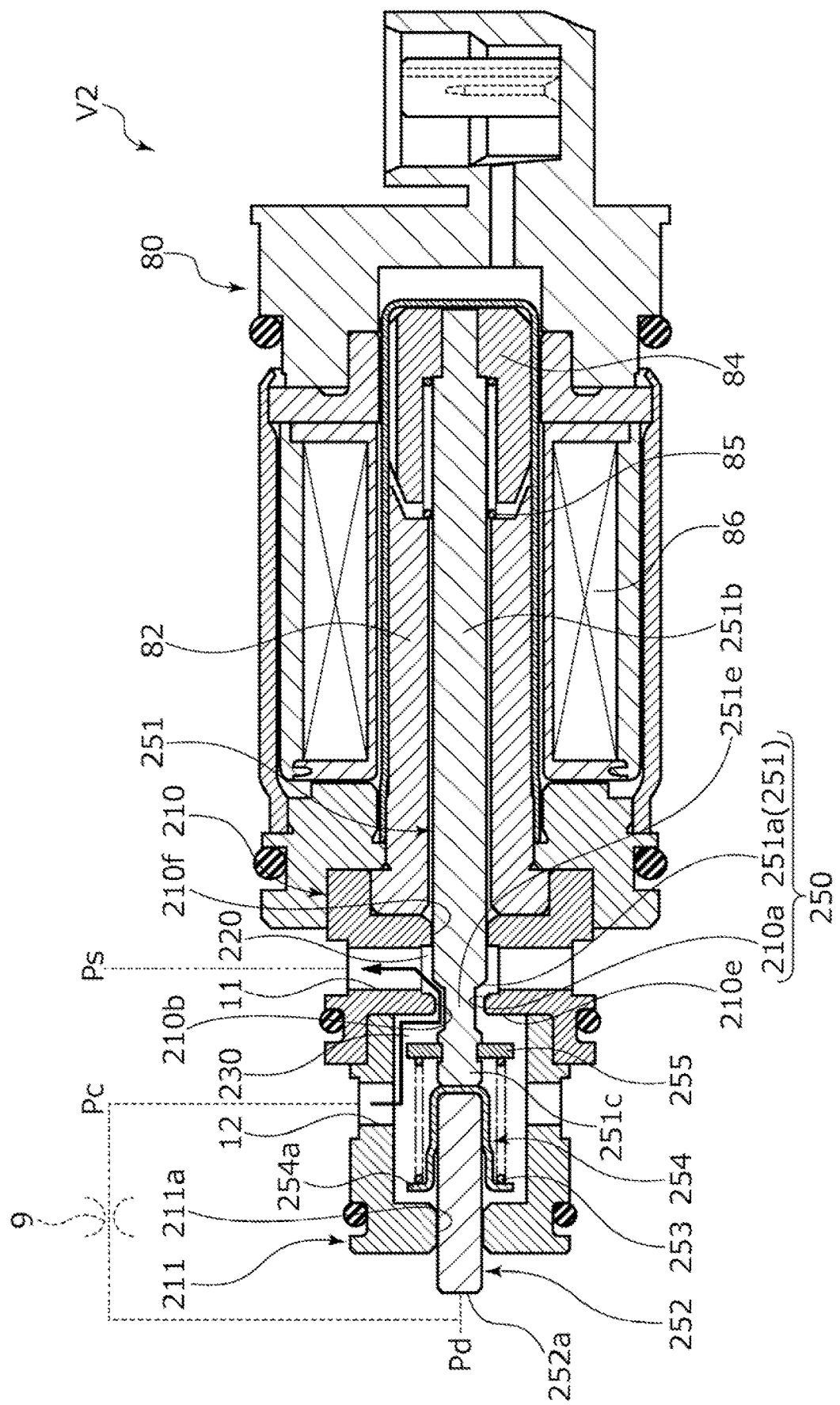
FIG. 6 is a sectional view showing a state where the CS valve is closed in an energized state (at the time of normal control) of the capacity control valve according to the second embodiment.
Figure 7:
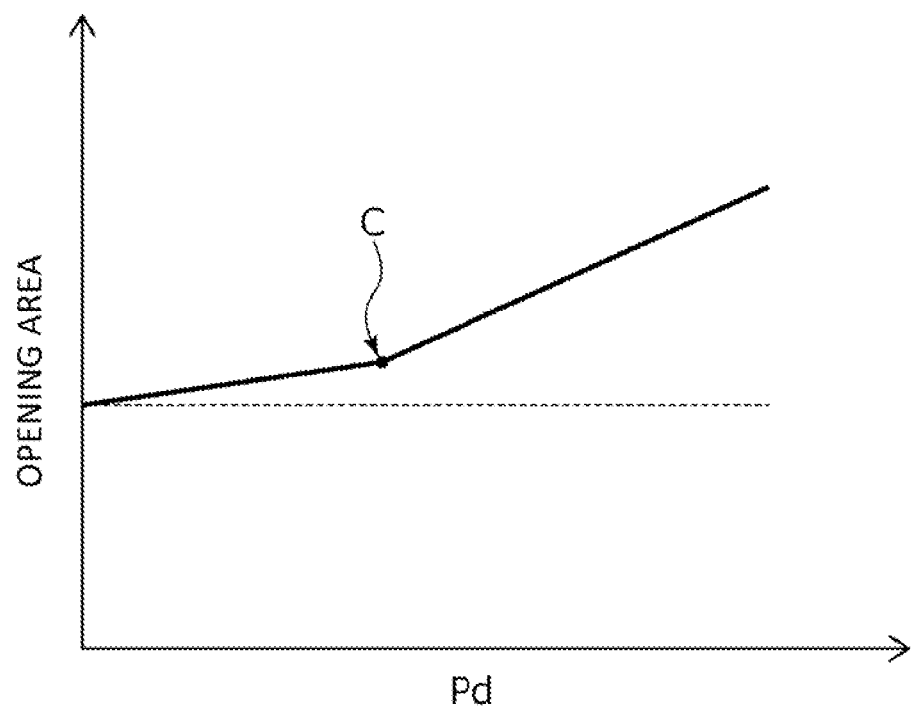
FIG. 7 is a graph showing a change characteristic of an opening area of the CS valve in accordance with discharge pressure Pd in an energized state (at the time of normal control) of the capacity control valve according to the second embodiment, in particular, at the time of a constant electric current.

In a capacity control valve V2 of the second embodiment, as shown in FIGS. 5 and 6, a CS valve element 251 serving as a valve element is a stepped and pillar-shaped body formed by integrating a large diameter portion 251b in which a step portion 251a is formed in an axially left end and a small diameter portion 251c provided continuously to the axially left side of the large diameter portion 251b, the small diameter portion having a smaller diameter than the large diameter portion 251b, and also serves as a rod arranged to pass through a coil 86 of a solenoid 80. The small diameter portion 251c has a constriction portion 251e having a smaller diameter than an axially left end of the small diameter portion 251c in a part which is continuous to the step portion 251a of the large diameter portion 251b. Thus, a flow passage having a constant section is ensured at the time of opening a CS valve 250.

In the second embodiment, as a valve housing, a first valve housing 210 and a second valve housing 211 inserted into this first valve housing 210 are mainly formed. In the first valve housing 210, a Ps port 11 serving as a suction port which communicates with a suction chamber of a variable displacement compressor is formed. In the second valve housing 211, a Pc port 12 serving as a control port which communicates with a control chamber of the variable displacement compressor is formed. In the first valve housing 210, a recessed portion 210e in which the radially inner side of an axially left end is recessed to the axially right side is formed, and an axially right end portion of the second valve housing 211 is integrally connected and fixed in a substantially sealed state by being inserted from the axially left side.

Inside the first valve housing 210, a first valve chamber 220 communicating with the Ps port 11, the first valve chamber in which an axially left end portion of the large diameter portion 251b of the CS valve element 251 is arranged reciprocatably in the axial direction is formed.

Inside the second valve housing 211, a second valve chamber 230 communicating with the Pc port 12, the second valve chamber in which the small diameter portion 251c of the CS valve element 251 is arranged reciprocatably in the axial direction is formed.

On an inner peripheral surface of the first valve housing 210, a valve hole 210b providing communication between the first valve chamber 220 and the second valve chamber 230, the valve hole into which the small diameter portion 251c of the CS valve element 251 is inserted is formed. On the inner peripheral surface of the first valve housing 210, a CS valve seat 210a is formed at an opening end edge of the valve hole 210b on the first valve chamber 220 side. Further, on the inner peripheral surface of the first valve housing 210, a guide hole 210f with which an outer peripheral surface of the large diameter portion 251b of the CS valve element 251 is slidable in a substantially sealed state is formed on the solenoid 80 side of the CS valve seat 210a and the first valve chamber 220. Between an inner peripheral surface of the guide hole 210f and the outer peripheral surface of the large diameter portion 251b of the CS valve element 251, a minute gap is formed by slightly separating in the radial direction. The CS valve element 251 is smoothly movable with respect to the first valve housing 210 in the axial direction.

On an inner peripheral surface of the second valve housing 211, a guide hole 211a with which an outer peripheral surface of a sliding rod 252 which is a separate body being separated from and facing the CS valve element 251 in the axial direction is slidable in a substantially sealed state is formed on the axially left side of the second valve chamber 230, that is, on the axially opposite side of the solenoid 80. Between an inner peripheral surface of the guide hole 211a and the outer peripheral surface of the sliding rod 252, a minute gap is formed by slightly separating in the radial direction. The sliding rod 252 is smoothly movable with respect to the second valve housing 211 in the axial direction. The sliding rod 252 is arranged at a position coaxial to the CS valve element 251.

An axially left end portion of the sliding rod 252 projects to the axially left side from the guide hole 211a of the second valve housing 211, and a pressure receiving surface 252a serving as a pressure receiving portion that receives discharge pressure Pd of a discharge chamber of the variable displacement compressor is formed in an axially left end. A support cap 254 is inserted onto an axially right end portion of the sliding rod 252 arranged in the second valve chamber 230 from the axially right side.

Between the sliding rod 252 and the CS valve element 251, a coil spring 253 serving as a biasing member is placed. In detail, the coil spring 253 is arranged in the second valve chamber 230, and held in a state where an axially left end of the coil spring 253 is abutted with an axially right end surface of a flange portion 254a extending to the radially outer side from an axially left end of the support cap 254, and an axially right end of the coil spring 253 is abutted with an axially left end surface of a support plate 255 fitted onto the small diameter portion 251c of the CS valve element 251. That is, regarding the sliding rod 252 and the CS valve element 251, axial end portions opposing each other are connected separably via the coil spring 253.

The discharge pressure Pd of a discharge fluid applied to the pressure receiving surface 252a having a pressure receiving area B which is equal to a sectional area of the sliding rod 252 is occasionally changed in accordance with a discharge amount of the variable displacement compressor required from the air conditioning system. Therefore, force $F_{Pd}$ applied to the CS valve element 251 to the axially right side is changed in accordance with the discharge pressure Pd. In a case where an electric current I energized in the solenoid 80 is constant, as shown by a solid graph line in FIG. 7, the force $F_{Pd}$ applied to the CS valve element 251 to the axially right side from the sliding rod 252 via the coil spring 253 is changed in accordance with the discharge pressure Pd.

In detail, in a state where the discharge pressure Pd is low, as shown in FIG. 5, by pressing the sliding rod 252 to the axially left side by bias force of the coil spring 253, an axially left end of the flange portion 254*a* of the support cap 254 inserted onto the sliding rod 252 is abutted with an inner surface of the second valve chamber 230 of the second valve housing 211. When the discharge pressure Pd is increased from this state, the sliding rod 252 starts moving to the axially right side against the bias force of the coil spring 253. When the discharge pressure becomes predetermined discharge pressure Pd, an axially right end of the support cap 254 moved together with the sliding rod 252 is abutted with an axially left end of the CS valve element 251, that is, an axially left end of the small diameter portion 251*c* (see FIG. 6). According to this, in a region from start of moving the axially right end of the support cap 254 before the axially right end is abutted with the axially left end of the CS valve element 251, that is, in a buffering region before an inflection point C in FIG. 7, the bias force of the coil spring 253 becomes resistance of force of moving the sliding rod 252 to the axially right side by an increase in the discharge pressure Pd. Thus, force in accordance with the discharge pressure Pd is not easily applied to the CS valve element 251. After the inflection point C in FIG. 7, since the state where the axially right end of the support cap 254 is abutted with the axially left end of the CS valve element 251 is maintained, the compression scale of the coil spring 253 is not changed, and the bias force of the coil spring 253 becomes constant with respect to an increase in the force in accordance with the discharge pressure Pd. Thus, the force in accordance with the discharge pressure Pd is more easily applied to the CS valve element 251.

By combining actions of the CS valve element 251 driven by the solenoid 80 and actions of the sliding rod 252 by the force in accordance with the discharge pressure Pd, it is possible to correct actions of the CS valve element 251. Thus, control characteristics by correction using the discharge pressure Pd are more easily appropriately changed. By changing a separation distance between the sliding rod 252 and the CS valve element 251 or a spring constant of the coil spring 253, the control characteristics by correction may be appropriately changed.

By making a valve opening portion area A where the step portion 251*a* of the CS valve element 251 and the CS valve seat 210*a* are brought into contact with and separated from each other and the pressure receiving area B of the sliding rod 252 substantially the same as each other, it is possible to cancel an influence of the control pressure Pc applied to the CS valve element 251. By forming the CS valve element 251 and the sliding rod 252 separately, it is possible to freely set the valve opening portion area A and the pressure receiving area B.

Figure 8:
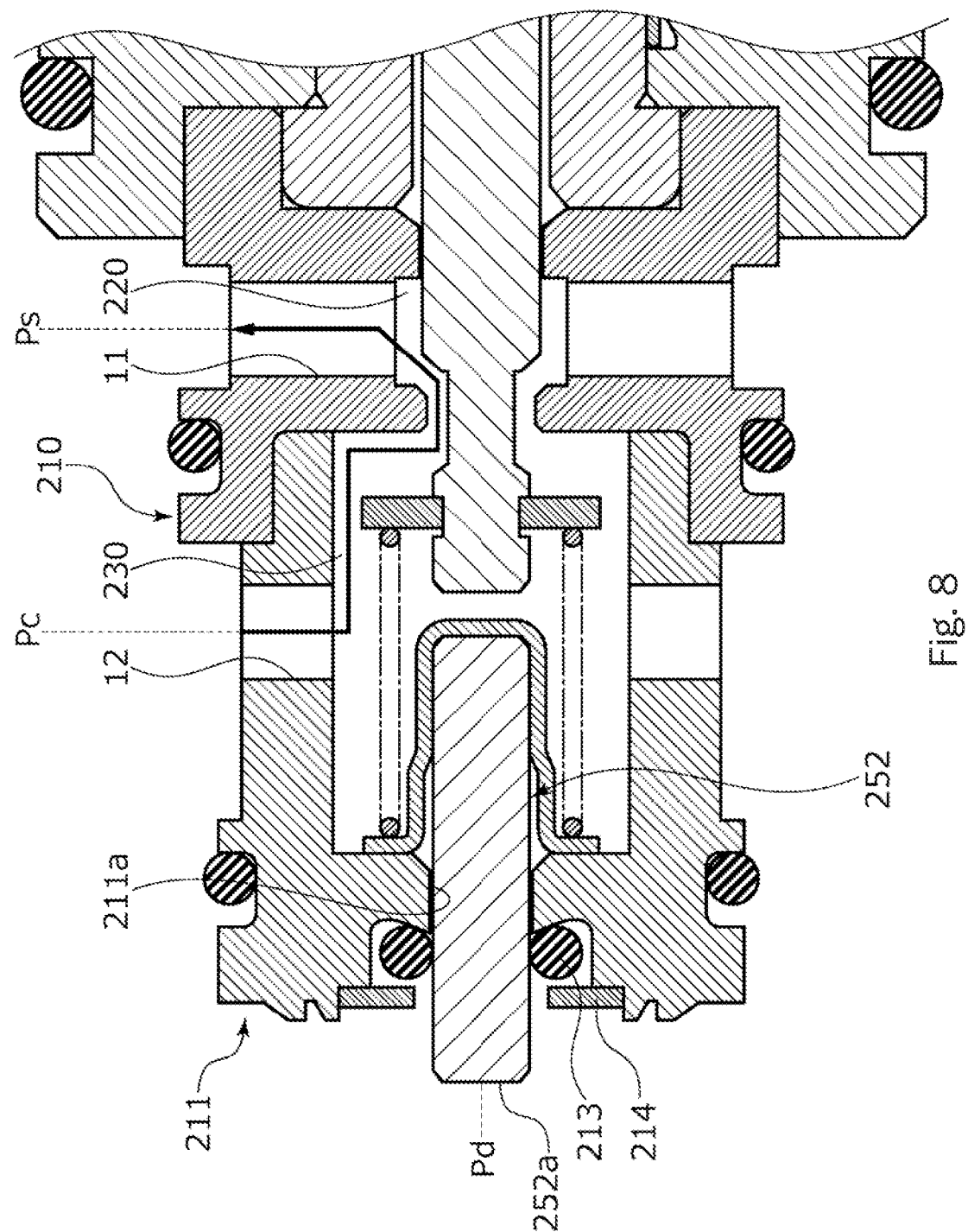
FIG. 8 is a sectional view showing a modified example of the capacity control valve according to the second embodiment.

As a modified example of the capacity control valve V2 of the second embodiment, as shown in FIG. 8, an O ring 213 serving as a seal portion that seals a part between the guide hole 211*a* and the sliding rod 252 may be provided on the axially opposite side of the solenoid 80, that is, in an axially left end portion of the second valve housing 211. According to this, the discharge fluid of the discharge pressure Pd applied to the pressure receiving surface 252*a* of the sliding rod 252 is prevented from intruding the first valve housing 210 and the second valve housing 211 through the guide hole 211*a*. Thus, it is possible to enhance a controlling property of the control pressure Pc. By substantially fixing the O ring 213 by a fixing member 214 provided in an axially left end of the second valve housing 211, it is possible to maintain a seal property irrespective of the actions of the sliding rod 252.

Third Embodiment

A capacity control valve according to a third embodiment of the present invention will be described with reference to FIGS. 9 to 11. Duplicated description for the same configurations as the second embodiment is omitted.

Figure 9:
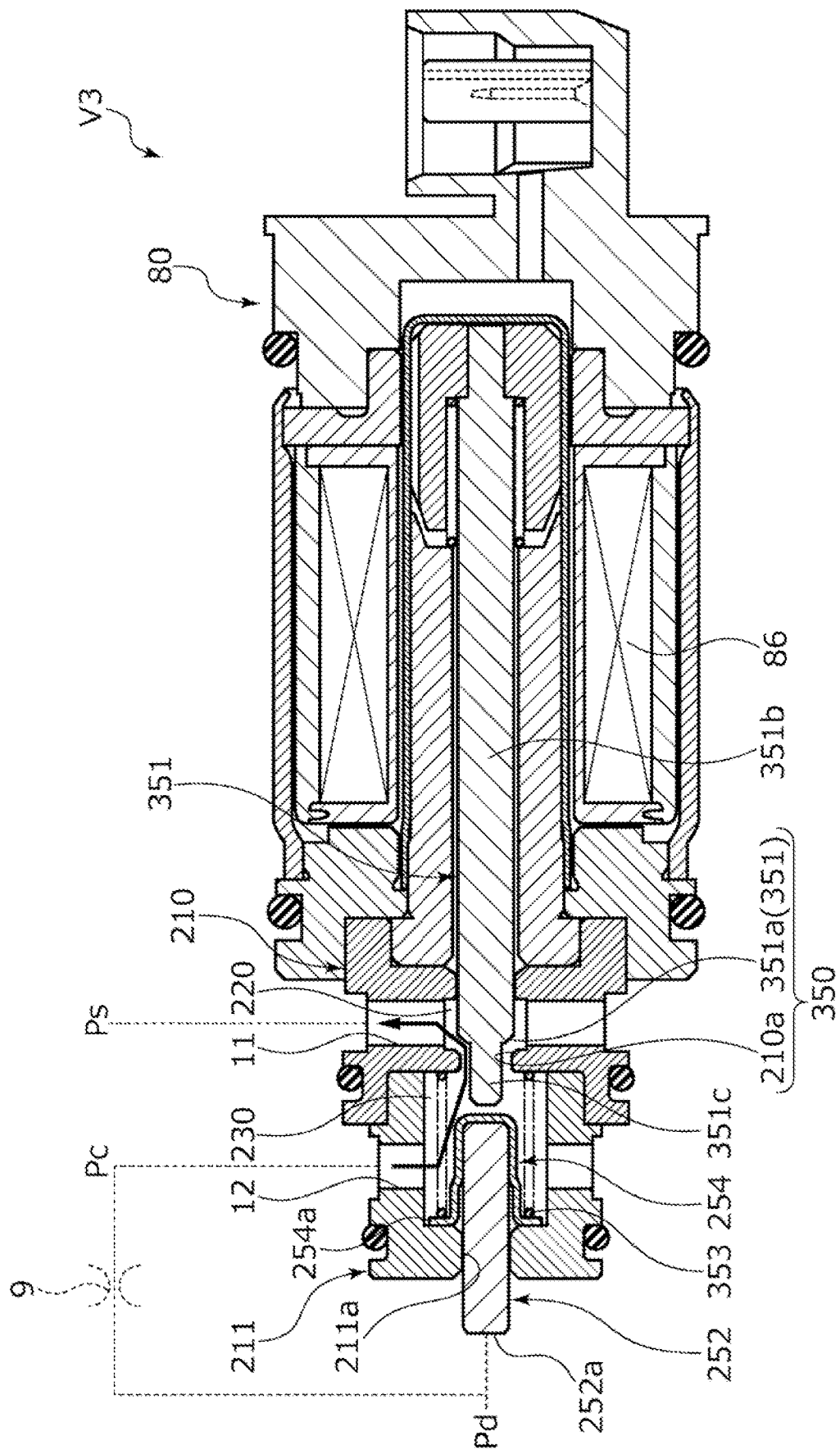
FIG. 9 is a sectional view showing a state where a CS valve is opened in a non-energized state of a capacity control valve according to a third embodiment of the present invention.
Figure 10:
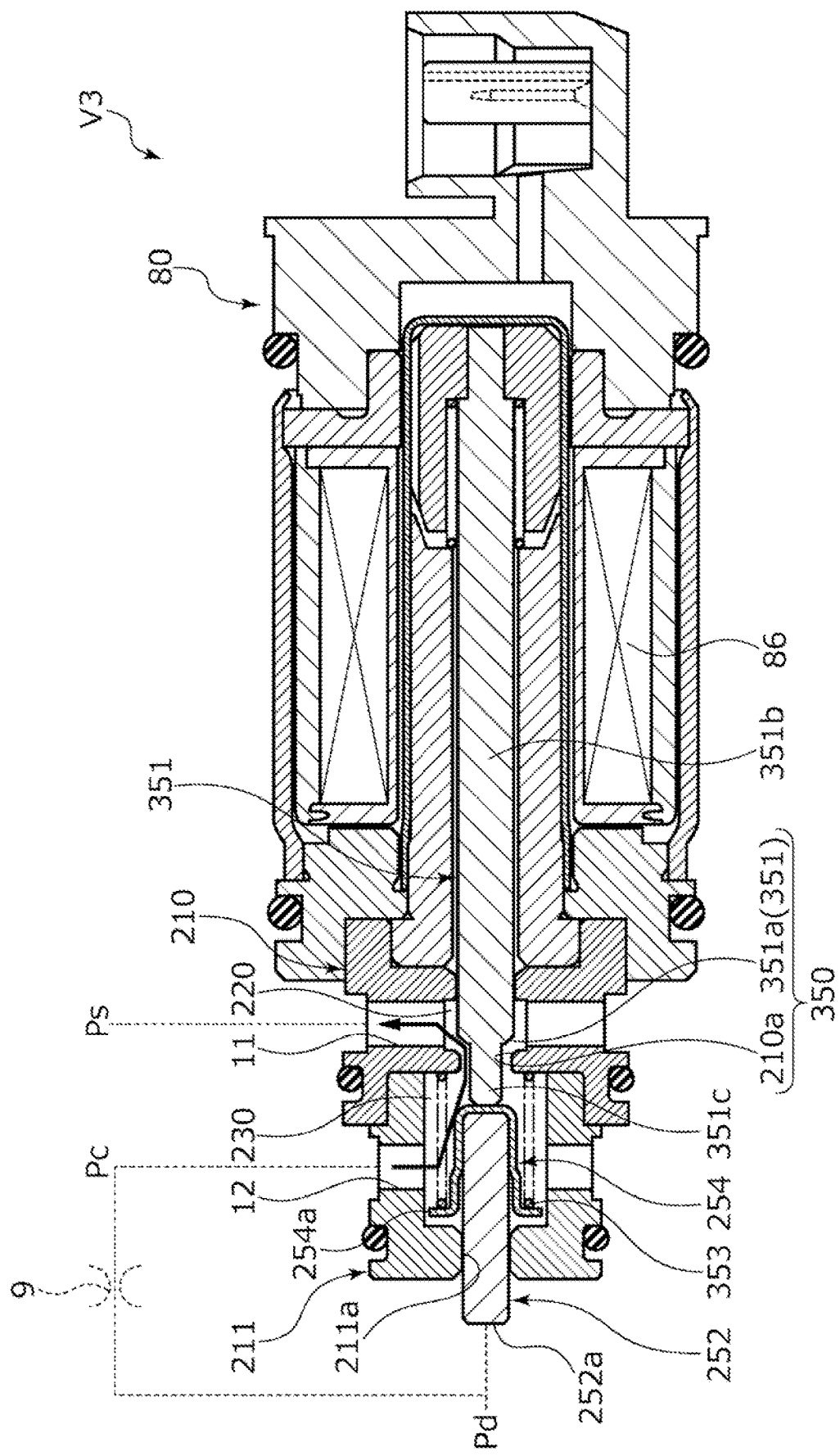
FIG. 10 is a sectional view showing a state where the CS valve is closed in an energized state (at the time of normal control) of the capacity control valve according to the third embodiment.

In a capacity control valve V3 of the third embodiment, as shown in FIGS. 9 and 10, a CS valve element 351 serving as a valve element is a stepped and pillar-shaped body formed by integrating a large diameter portion 351*b* in which a step portion 351*a* is formed in an axially left end and a small diameter portion 351*c* provided continuously to the axially left side of the large diameter portion 351*b*, the small diameter portion having a smaller diameter than the large diameter portion 351*b*, and also serves as a rod arranged to pass through a coil 86 of a solenoid 80. By forming the small diameter portion 351*c* in the CS valve element 351, a flow passage having a constant section is ensured at the time of opening a CS valve 350.

Between a sliding rod 252 which is a separate body being separated from and facing the CS valve element 351 in the axial direction and an axially left end of a first valve housing 210, a coil spring 353 serving as a biasing member is placed. In detail, the coil spring 353 is arranged in a second valve chamber 230 and held in a state where an axially left end of the coil spring 353 is abutted with an axially right end surface of a flange portion 254*a* formed in a support cap 254, and an axially right end of the coil spring 353 is abutted with an axially left end surface of the first valve housing 210. That is, regarding the sliding rod 252 and the CS valve element 351, axial end portions opposing each other are arranged connectably and separably.

Figure 11:
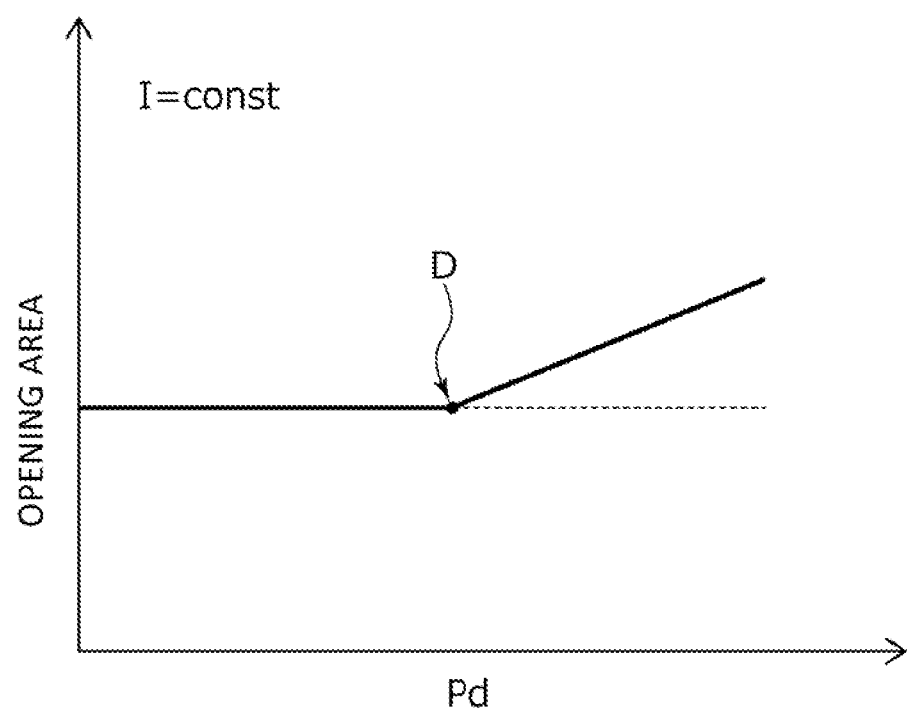
FIG. 11 is a graph showing a change characteristic of an opening area of the CS valve in accordance with discharge pressure Pd in an energized state (at the time of normal control) of the capacity control valve according to the third embodiment, in particular, at the time of a constant electric current.

According to this, as shown in FIG. 10, in a region from start of moving an axially right end of the support cap 254 before the axially right end is abutted with an axially left end of the CS valve element 351, that is, in a buffering region before an inflection point D in FIG. 11, force in accordance with discharge pressure Pd is not applied to a valve opening degree of the CS valve 350. After the inflection point D in FIG. 11, since the axially right end of the support cap 254 is abutted with an axially left end of the small diameter portion 351*c*, bias force of the coil spring 353 becomes resistance of force of moving the sliding rod 252 to the axially right side by an increase in the discharge pressure Pd. Thus, the force in accordance with the discharge pressure Pd is not easily applied to the CS valve element 351.

By combining actions of the CS valve element 351 driven by the solenoid 80 and actions of the sliding rod 252 by the force in accordance with the discharge pressure Pd, it is possible to set a region where the actions of the CS valve element 351 are corrected and a region where the actions are not corrected. Thus, control characteristics by correction using the discharge pressure Pd are more easily appropriately changed. By changing a separation distance between the sliding rod 252 and the CS valve element 351 or a spring constant of the coil spring 353, the control characteristics by correction may be appropriately changed.

Figure 12:
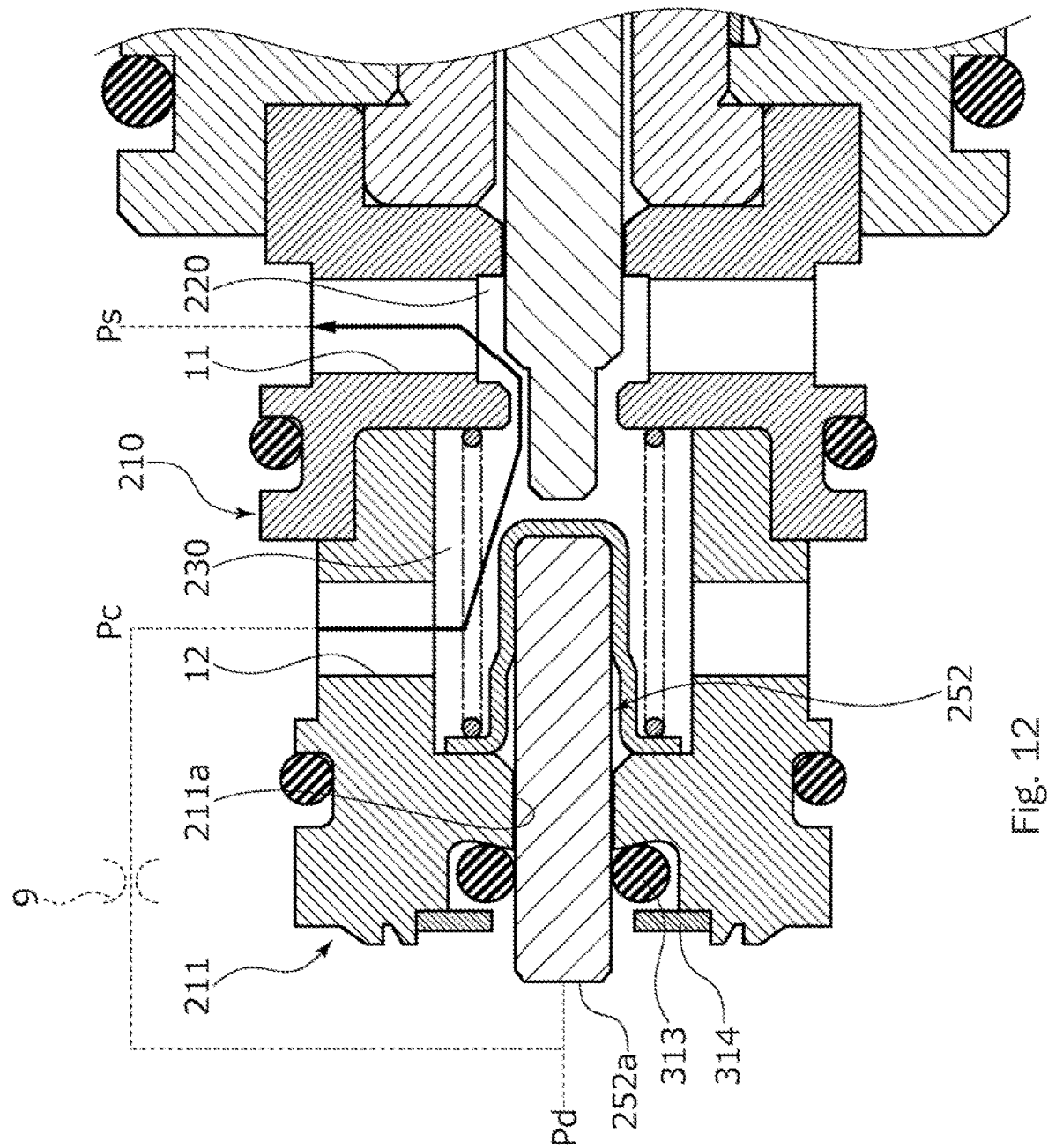
FIG. 12 is a sectional view showing a modified example of the capacity control valve according to the third embodiment.

As a modified example of the capacity control valve V3 of the third embodiment, as shown in FIG. 12, an O ring 313 serving as a seal portion that seals a part between a guide hole 211a provided on the axially opposite side of the solenoid 80, that is, in the second valve housing 211 and the sliding rod 252 may be provided. According to this, a discharge fluid of the discharge pressure Pd applied to a pressure receiving surface 252a of the sliding rod 252 is prevented from intruding the first valve housing 210 and the second valve housing 211 through the guide hole 211a. Thus, it is possible to enhance a controlling property of control pressure Pc. By substantially fixing the O ring 313 by a fixing member 314 provided in an axially left end of the second valve housing 211, it is possible to maintain a seal property irrespective of the actions of the sliding rod 252.

Fourth Embodiment

A capacity control valve according to a fourth embodiment of the present invention will be described with reference to FIGS. 13 to 15. Duplicated description for the same configurations as the first embodiment is omitted.

Figure 13:
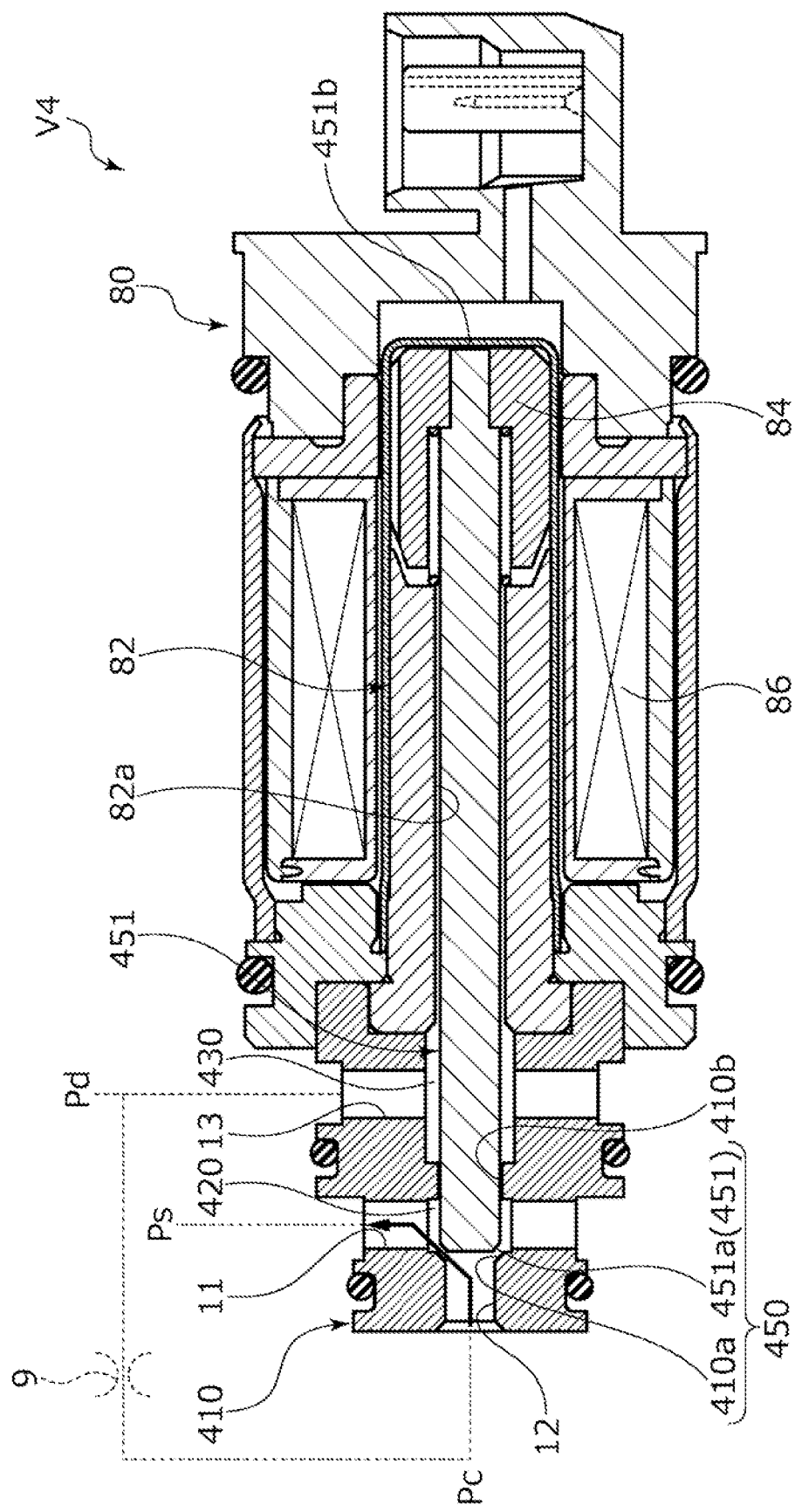
FIG. 13 is a sectional view showing a state where a CS valve is opened in a non-energized state of a capacity control valve according to a fourth embodiment of the present invention.
Figure 14:
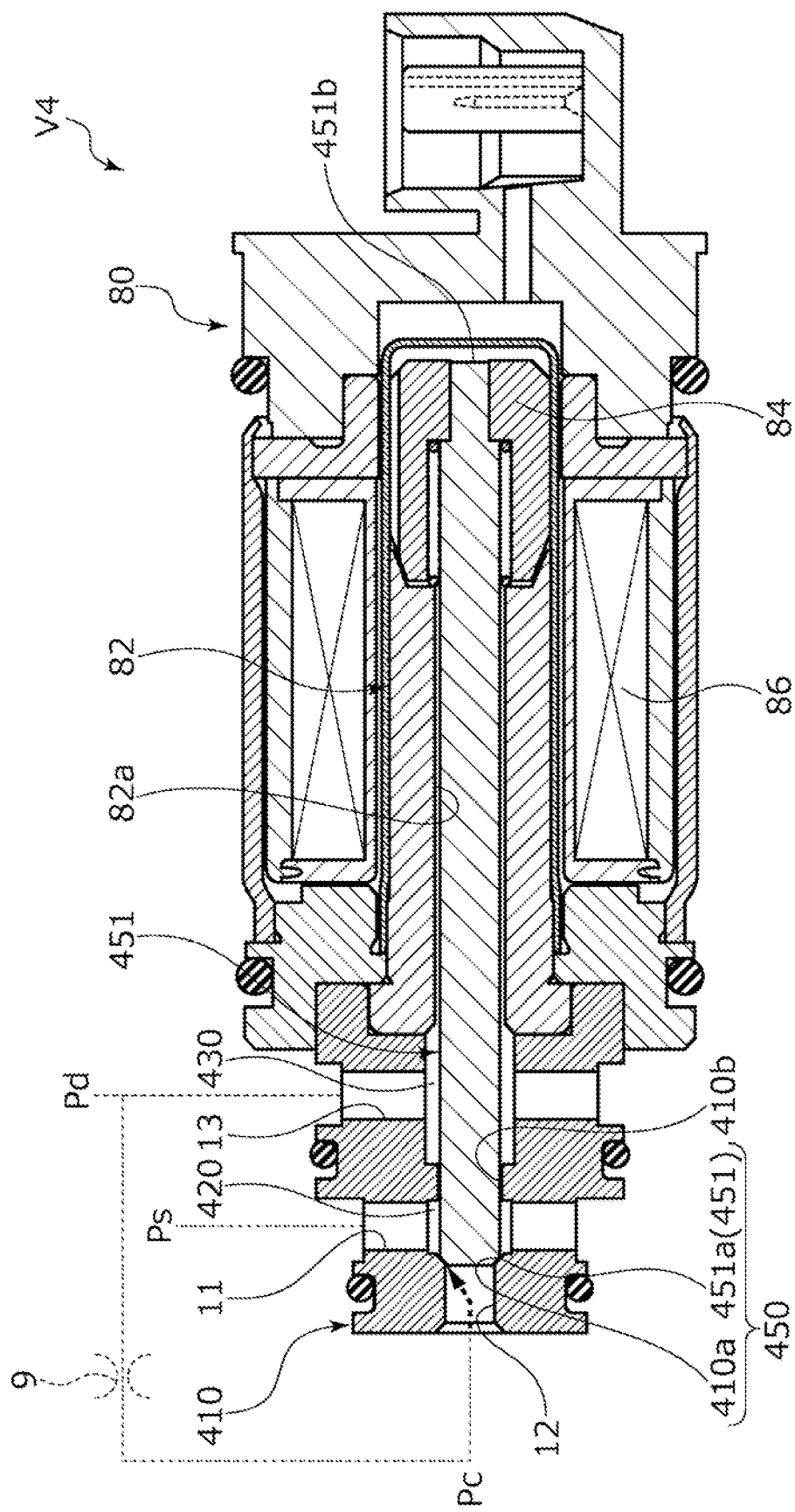
FIG. 14 is a sectional view showing a state where the CS valve is closed in an energized state (e.g., at the time of normal control) of the capacity control valve according to the fourth embodiment.
Figure 15:
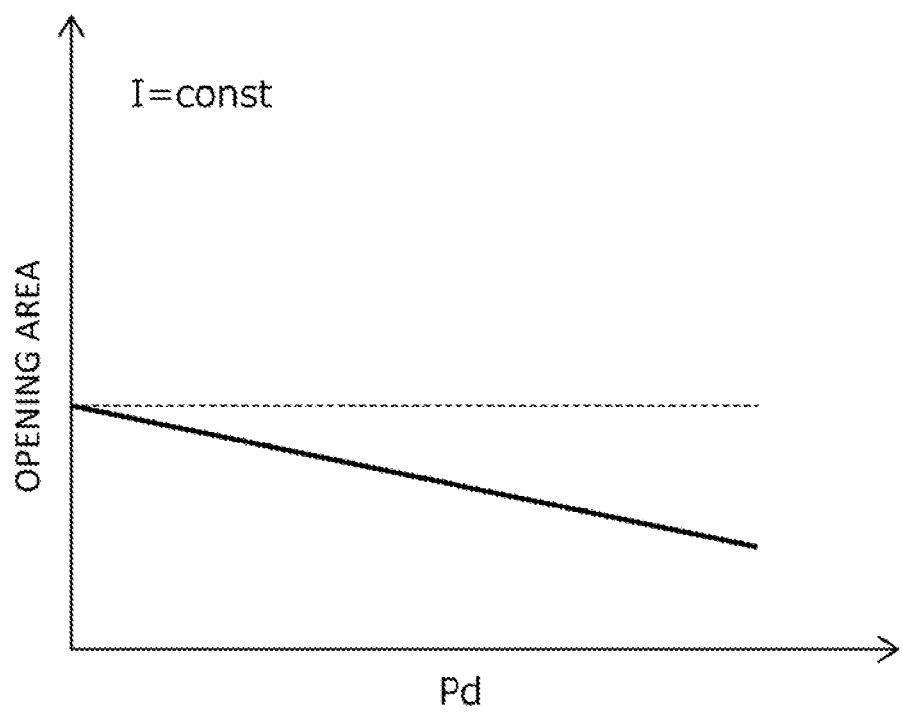
FIG. 15 is a graph showing a change characteristic of an opening area of the CS valve in accordance with discharge pressure Pd in an energized state (e.g., at the time of normal control) of the capacity control valve according to the fourth embodiment, in particular, at the time of a constant electric current.

In a capacity control valve V4 according to the fourth embodiment of the present invention, as shown in FIGS. 13 and 14, a CS valve element 451 serving as a valve element is an integrated pillar-shaped body having a substantially constant section and also serves as a rod arranged to pass through a coil 86 of a solenoid 80. A pressure receiving surface 451b serving as a pressure receiving portion that receives discharge pressure Pd of a discharge chamber of a variable displacement compressor is formed in an axially right end of a CS valve element 451.

In a valve housing 410, a Ps port 11 serving as a suction port which communicates with a suction chamber of the variable displacement compressor, and a Pc port 12 serving as a control port which communicates with a control chamber of the variable displacement compressor, and a Pd port 13 communicating with the discharge chamber of the variable displacement compressor are formed.

Inside the valve housing 410, a first valve chamber 420 in which an axially left end portion of the CS valve element 451 is arranged reciprocatably in the axial direction is formed on the axially left side, the Ps port 11 extends in the radially inward direction from an outer peripheral surface of the valve housing 410 and communicates with the first valve chamber 420, and the Pc port 12 extends to the axially right side from the radially inner side of an axially left end of the valve housing 410 and communicates with the first valve chamber 420. Inside the valve housing 410, a second valve chamber 430 communicating with the Pd port 13 is formed on the axially right side, that is, on the solenoid 80 side.

On an inner peripheral surface of the valve housing 410, a guide hole 410b passing through between the first valve chamber 420 and the second valve chamber 430, the guide hole with which an outer peripheral surface of the axially left end portion of the CS valve element 451 is slidable in a substantially sealed state is formed. On the inner peripheral surface of the valve housing 410, a CS valve seat 410a is formed at an opening end edge of the Pc port 12 on the first valve chamber 420 side. Between an inner peripheral surface of the guide hole 410b and the outer peripheral surface of the CS valve element 451, a minute gap is formed by slightly separating in the radial direction. The CS valve element 451 is smoothly movable with respect to the valve housing 410 in the axial direction.

The first valve chamber 420 and the second valve chamber 430 are sealed in a substantially sealed state by a clearance seal serving as a seal portion which is formed by the inner peripheral surface of the guide hole 410b and the outer peripheral surface of the CS valve element 451. Thus, a discharge fluid of the discharge pressure Pd supplied from the Pd port 13 to the second valve chamber 430 is prevented from intruding the first valve chamber 420. The discharge fluid of the discharge pressure Pd supplied from the Pd port 13 to the second valve chamber 430 can run round to the back surface side of the CS valve element 451 to which a movable iron core 84 is inserted, that is, to a pressure receiving surface 451b formed in the axially right end of the CS valve element 451 through a gap between an inner peripheral surface of an insertion hole 82a extending in the axial direction in a center post 82 which forms the solenoid 80, and the outer peripheral surface of the CS valve element 451 inserted into the insertion hole 82a.

Next, actions of the capacity control valve V4, mainly actions of opening and closing a CS valve 450 will be described.

First, a non-energized state of the capacity control valve V4 will be described. As shown in FIG. 13, in the capacity control valve V4, in a non-energized state, by pressing the movable iron core 84 to the axially right side by bias force of a coil spring 85, the CS valve element 451 is moved to the axially right side together, an axially left end 451a of the CS valve element 451 is separated from the CS valve seat 410a, and the CS valve 450 is opened.

At this time, to the CS valve element 451, the bias force $F_{sp}$ of the coil spring 85 and force $F_{Pc}$ by control pressure Pc of a control fluid to the CS valve element 451 are applied to the axially right side, and force $F_{Pd}$ by the discharge pressure Pd of the discharge fluid to the pressure receiving surface 451b of the CS valve element 451 is applied to the axially left side. That is, given that the right side is the positive side, force $F_{rod}=F_{sp}+F_{Pc}-F_{Pd}$ is applied to the CS valve element 451.

Next, an energized state of the capacity control valve V4 will be described. As shown in FIG. 14, in the capacity control valve V4, in an energized state, that is, at the time of normal control, at the time of so-called duty control, when electromagnetic force $F_{sol}$ generated by applying an electric current to the solenoid 80 exceeds the force $F_{rod}$ (i.e., $F_{sol}>F_{rod}$), by pulling the movable iron core 84 to the axially left side, that is, toward the center post 82, and moving the CS valve element 451 fixed to the movable iron core 84 to the axially left side together, the axially left end 451a of the CS valve element 451 is seated on the CS valve seat 410a, and the CS valve 450 is closed.

At this time, to the CS valve element 451, the electromagnetic force $F_{sol}$ is applied on the axially left side, and the force $F_{rod}$ is applied on the axially right side. That is, given that the right side is the positive side, force $F_{rod}-F_{sol}$, in detail, force $F_{sp}+F_{Pc}-F_{Pd}-F_{sol}$ is applied to the CS valve element 451.

The discharge pressure Pd applied to the pressure receiving surface 451b of the CS valve element 451 is occasionally changed in accordance with the discharge amount of the variable displacement compressor required from an air conditioning system. Therefore, the force $F_{Pd}$ applied to the CS valve element 451 to the axially right side is changed in accordance with the discharge pressure Pd. In a case where the electric current I energized in the solenoid 80 is constant, as shown by a solid graph line in FIG. 15, an opening area of the CS valve 450 is decreased in proportion to the discharge pressure Pd.

According to this, in the capacity control valve V4, Pc-Ps control that opens and closes the CS valve 450 to supply the control fluid of the control pressure Pc supplied from the Pc port 12 to the suction chamber via the Ps port 11 and lower the control pressure Pc of the control chamber is performed, and the discharge pressure Pd supplied from the Pd port 13, the discharge pressure being higher pressure than the control pressure Pc and suction pressure Ps can be applied to the pressure receiving surface 451b of the CS valve element 451 to the axially left side, that is, in the valve closing direction of the CS valve 450, and used for correction of actions of the CS valve element 451. Therefore, a valve opening degree of the CS valve 450 is more easily adjusted and it is possible to let the control pressure Pc of the air conditioning system reach a target value in a short time.

By forming an annular groove on the inner peripheral surface of the guide hole 410b and the outer peripheral surface of the CS valve element 451, a seal property in the clearance seal may be enhanced by a labyrinth effect of the groove.

The embodiments of the present invention are described above with the drawings. However, specific configurations are not limited to these embodiments but the present invention includes changes and additions within the range not departing from the scope of the present invention.

For example, the above embodiments describe that the CS valve element also serves as the rod arranged to pass through the coil 86 of the solenoid 80. However, the present invention is not limited to this but the CS valve element may be formed reciprocatably in the axial direction together with a separate rod.

The above embodiments describe that the capacity control valves V1 to V4 are formed as a normal open type in which the CS valve element is biased in the valve opening direction of the CS valve by the coil spring 85. However, the present invention is not limited to this but the capacity control valves may be formed as a normal close type in which the CS valve element is biased in the valve closing direction of the CS valve by the coil spring 85.

The above embodiments describe the configuration that the Pc port 12 is formed on the axially left side of the Ps port 11. However, arrangement may be switched in such a manner that the Pc port 12 is formed on the axially right side of the Ps port 11. In this case, a shape or arrangement of the CS valve element and the CS valve seat are appropriately changed.

The above first to third embodiments describe that the CS valve element or the axially left end portion of the sliding rod in which the pressure receiving surface is formed projects to the axially left side from the guide hole. However, the present invention is not limited to this but the CS valve element or the axially left end of the sliding rod, that is, the pressure receiving surface may be always arranged inside the guide hole.

The above first to third embodiments describe the configuration that the O ring serving as the seal portion that seals the part between the guide hole and the CS valve element or the sliding rod is provided as the modified example. However, the present invention is not limited to this but the seal portion may be freely formed as long as the discharge fluid of the discharge pressure Pd applied to the pressure receiving surface can be prevented from intruding the valve housing.

In the above second embodiment, the sliding rod 252 and the CS valve element 251 may be not abutted but always separated from each other in the axial direction.

In the above third embodiment, the coil spring 353 is not limited to be placed between the sliding rod 252 and the axially left end of the first valve housing 210. The axially right end of the coil spring 353 may be abutted with an inward flange portion formed on the inner peripheral surface of the second valve housing 211, for example.

The pressure receiving portion is not limited to be formed on the axial end surface of the CS valve element or the sliding rod. For example, in the above fourth embodiment, an axially right end of the CS valve element may be completely covered by the movable iron core and the force in accordance with the discharge pressure Pd may be applied to the CS valve element with an axially right end of the movable iron core serving as the pressure receiving portion.

REFERENCE SIGNS LIST

9 Fixed orifice
10 Valve housing
10a CS valve seat
10c Guide hole
11 Ps port (suction port)
12 Pc port (control port)
13 Pd port
20 First valve chamber
30 Second valve chamber
50 CS valve
51 CS valve element (valve element)
51a Step portion
51d Pressure receiving surface (pressure receiving portion)
80 Solenoid
85 Coil spring (spring)
113 O ring (seal portion)
210 First valve housing (valve housing)
210a CS valve seat
211 Second valve housing (valve housing)
211a Guide hole
213 O ring (seal portion)
250 CS valve
251 CS valve element (valve element)
251a Step portion
252 Sliding rod
252a Pressure receiving surface (pressure receiving portion)
253 Coil spring (biasing member)
254 Support cap
255 Support plate
313 O ring (seal portion)
350 CS valve
351 CS valve element (valve element)
351a Step portion
353 Coil spring (biasing member)
410 Valve housing
410a CS valve seat
410b Guide hole
450 CS valve
451 CS valve element (valve element)
451b Pressure receiving surface (pressure receiving portion)
Pc Control pressure
Pd Discharge pressure
Ps Suction pressure
V1 to V4 Capacity control valve

The invention claimed is:

1. A capacity control valve comprising:
a valve housing provided with a suction port through which a suction fluid of suction pressure passes, and a control port through which a control fluid of control pressure passes;

a valve element configured to be driven by a solenoid;
a spring that biases the valve element in a direction opposite to a driving direction by the solenoid; and
a CS valve formed by a CS valve seat and the valve element and configured for opening and closing a communication between the control port and the suction port by a movement of the valve element, wherein
the control pressure is controlled by opening and closing the CS valve,
the valve housing is provided with a guide hole configured to connect a first space in which the CS valve is housed to a second space into which a discharge fluid of a discharge pressure is introduced,
the valve element or a sliding rod which is a separate body facing and being separated from the valve element in an axial direction is slidably fitted into the guide hole,
the valve element or the sliding rod has a pressure receiving portion includes at least one pressure receiving surface which receives the discharge pressure in the axial direction,
all the pressure receiving surfaces face toward a side opposed to the solenoid in the axial direction, receive the discharge pressure in a direction in which the CS valve is closed, and form whole the pressure receiving portion,
a contact portion of the valve element which is brought into contact with the CS valve seat is positioned on a side of the solenoid with respect to the CS valve seat in the axial direction, and
the CS valve seat is disposed between the pressure receiving portion and the solenoid in the axial direction.

2. The capacity control valve according to claim 1, wherein
the pressure receiving portion is provided in the valve element.

3. The capacity control valve according to claim 1, wherein
the pressure receiving portion is provided in a sliding rod which is a separate body separated from and facing the valve element.

4. The capacity control valve according to claim 3, wherein
the sliding rod is connectably separated from the valve element.

5. The capacity control valve according to claim 3, wherein
a biasing member is provided between the sliding rod and the valve element.

6. The capacity control valve according to claim 4, wherein
a biasing member is provided between the sliding rod and the valve housing.

7. The capacity control valve according to claim 1, wherein
the valve element is biased in a valve opening direction of the CS valve by the spring.

8. The capacity control valve according to claim 4, wherein
a biasing member is provided between the sliding rod and the valve element.

9. The capacity control valve according to claim 2, wherein
the valve element is biased in a valve opening direction of the CS valve by the spring.

10. The capacity control valve according to claim 3, wherein
the valve element is biased in a valve opening direction of the CS valve by the spring.

11. The capacity control valve according to claim 4, wherein
the valve element is biased in a valve opening direction of the CS valve by the spring.

12. The capacity control valve according to claim 5, wherein
the valve element is biased in a valve opening direction of the CS valve by the spring.

13. The capacity control valve according to claim 6, wherein
the valve element is biased in a valve opening direction of the CS valve by the spring.

14. The capacity control valve according to claim 2, further comprising an O ring provided adjacent to an axial end of the guide hole and configured to seal a gap between the valve element and an inner peripheral surface of the valve housing which defines the guide hole.

15. The capacity control valve according to claim 3, further comprising an O ring provided adjacent to an axial end of the guide hole and configured to seal a gap between the sliding rod and an inner peripheral surface of the valve housing which defines the guide hole.

16. The capacity control valve according to claim 4, further comprising an O ring provided adjacent to an axial end of the guide hole and configured to seal a gap between the sliding rod and an inner peripheral surface of the valve housing which defines the guide hole.

17. The capacity control valve according to claim 5, further comprising an O ring provided adjacent to an axial end of the guide hole and configured to seal a gap between the sliding rod and an inner peripheral surface of the valve housing which defines the guide hole.

18. The capacity control valve according to claim 6, further comprising an O ring provided adjacent to an axial end of the guide hole and configured to seal a gap between the sliding rod and an inner peripheral surface of the valve housing which defines the guide hole.

19. The capacity control valve according to claim 14, wherein
the valve element is biased in a valve opening direction of the CS valve by the spring.

20. The capacity control valve according to claim 15, wherein
the valve element is biased in a valve opening direction of the CS valve by the spring.

* * * * *